(12) United States Patent
Worley, III et al.

(10) Patent No.: US 9,721,386 B1
(45) Date of Patent: Aug. 1, 2017

(54) INTEGRATED AUGMENTED REALITY ENVIRONMENT

(75) Inventors: William Spencer Worley, III, Half Moon Bay, CA (US); Jonathan Betts-LaCroix, Belmont, CA (US); Edward Dietz Crump, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 694 days.

(21) Appl. No.: 12/978,800

(22) Filed: Dec. 27, 2010

(51) Int. Cl.
*G06T 19/00* (2011.01)
*G06F 3/01* (2006.01)

(52) U.S. Cl.
CPC ............ *G06T 19/006* (2013.01); *G06F 3/017* (2013.01)

(58) Field of Classification Search
CPC ......... G06T 19/00; G06T 19/006; G06F 3/01; G06F 3/011; G06F 3/012; G06F 3/017; G06F 3/04815; G02B 27/017; H04M 2203/359; G05B 2219/32014; G05B 2219/39449
USPC .................................................. 345/505, 633
See application file for complete search history.

(56) References Cited

U.S. PATENT DOCUMENTS

| | | | |
|---|---|---|---|
| 3,835,245 A | 9/1974 | Pieters | |
| 3,840,699 A | 10/1974 | Bowerman | |
| 4,112,463 A | 9/1978 | Kamin | |
| 5,704,836 A | 1/1998 | Norton et al. | |
| 5,946,209 A | 8/1999 | Eckel et al. | |
| 6,059,576 A | 5/2000 | Brann | |
| 6,098,091 A * | 8/2000 | Kisor | ............... 709/202 |
| 6,503,195 B1 * | 1/2003 | Keller et al. | ............ 600/160 |
| 6,618,076 B1 | 9/2003 | Sukthankar et al. | |
| 6,690,618 B2 | 2/2004 | Tomasi et al. | |
| 6,760,045 B1 | 7/2004 | Quinn et al. | |
| 6,789,903 B2 | 9/2004 | Parker et al. | |
| 6,803,928 B2 | 10/2004 | Bimber et al. | |

(Continued)

FOREIGN PATENT DOCUMENTS

| | | |
|---|---|---|
| WO | WO2009112585 | 9/2009 |
| WO | WO2011088053 A2 | 7/2011 |
| WO | WO2011/115823 A1 | 9/2011 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — Ulka Chauhan
*Assistant Examiner* — Sae Won Yoon
(74) *Attorney, Agent, or Firm* — Lee & Hayes, PLLC

(57) ABSTRACT

Augmented reality environments allow users in their physical environment to interact with virtual objects and information. Augmented reality applications are developed and configured to utilize local as well as cloud resources. Application management allows control over distribution of applications to select groups or all users. An application programming interface allows simplified control and distribution of tasks between local and cloud resources during development and post-development operation. This integration between local and cloud resources along with the control afforded by application management allows rapid development, testing, deployment, and updating of augmented reality applications.

24 Claims, 13 Drawing Sheets

(56) References Cited

U.S. PATENT DOCUMENTS

| | | |
|---|---|---|
| 6,811,267 B1 | 11/2004 | Allen et al. |
| 7,046,214 B2* | 5/2006 | Ebersole et al. ............... 345/7 |
| 7,134,756 B2 | 11/2006 | Drucker et al. |
| 7,168,813 B2 | 1/2007 | Wong et al. |
| 7,315,241 B1* | 1/2008 | Daily et al. ............... 340/525 |
| 7,418,392 B1 | 8/2008 | Mozer et al. |
| 7,538,764 B2 | 5/2009 | Salomie |
| 7,720,683 B1 | 5/2010 | Vermeulen et al. |
| 7,743,348 B2 | 6/2010 | Robbins et al. |
| 7,774,204 B2 | 8/2010 | Mozer et al. |
| 7,911,444 B2 | 3/2011 | Yee |
| 7,925,996 B2 | 4/2011 | Hofmeister et al. |
| 7,949,148 B2 | 5/2011 | Rhoads et al. |
| 7,991,220 B2 | 8/2011 | Nagai et al. |
| 8,107,736 B2 | 1/2012 | Brown et al. |
| 8,159,739 B2 | 4/2012 | Woodgate et al. |
| 8,199,966 B2 | 6/2012 | Guven et al. |
| 8,253,746 B2* | 8/2012 | Geisner et al. ............... 345/474 |
| 8,255,829 B1* | 8/2012 | McCormick et al. ........ 715/810 |
| 8,264,536 B2 | 9/2012 | McEldowney |
| 8,284,205 B2* | 10/2012 | Miller et al. ............... 345/502 |
| 8,285,256 B2 | 10/2012 | Gupta et al. |
| 8,307,388 B2 | 11/2012 | Igoe et al. |
| 8,308,304 B2 | 11/2012 | Jung et al. |
| 8,356,254 B2 | 1/2013 | Dennard et al. |
| 8,382,295 B1 | 2/2013 | Kim et al. |
| 8,408,720 B2 | 4/2013 | Nishigaki et al. |
| 8,591,039 B2 | 11/2013 | Morrison et al. |
| 8,723,787 B2 | 5/2014 | Jung et al. |
| 8,743,145 B1 | 6/2014 | Price |
| 2001/0049713 A1* | 12/2001 | Arnold et al. ............... 709/105 |
| 2001/0056574 A1 | 12/2001 | Richards |
| 2002/0001044 A1 | 1/2002 | Villamide |
| 2002/0070278 A1 | 6/2002 | Hung et al. |
| 2002/0078169 A1* | 6/2002 | French ............... H04L 29/06 709/218 |
| 2002/0168069 A1 | 11/2002 | Tehranchi et al. |
| 2003/0156306 A1 | 8/2003 | Kitamura |
| 2004/0046736 A1 | 3/2004 | Pryor et al. |
| 2004/0114581 A1 | 6/2004 | Hans et al. |
| 2004/0190716 A1 | 9/2004 | Nelson |
| 2004/0201823 A1 | 10/2004 | Raskar et al. |
| 2005/0081164 A1 | 4/2005 | Hama et al. |
| 2005/0099432 A1 | 5/2005 | Chavis et al. |
| 2005/0110964 A1 | 5/2005 | Bell et al. |
| 2005/0128196 A1 | 6/2005 | Popescu et al. |
| 2005/0254683 A1 | 11/2005 | Schumann et al. |
| 2005/0264555 A1 | 12/2005 | Zhou et al. |
| 2005/0276444 A1* | 12/2005 | Zhou et al. ............... 382/103 |
| 2005/0288078 A1 | 12/2005 | Cheok et al. |
| 2005/0289590 A1* | 12/2005 | Cheok et al. ............... 725/37 |
| 2006/0028400 A1* | 2/2006 | Lapstun et al. ............... 345/8 |
| 2006/0041926 A1 | 2/2006 | Istvan et al. |
| 2006/0080408 A1 | 4/2006 | Istvan et al. |
| 2006/0152803 A1 | 7/2006 | Provitola |
| 2006/0170880 A1 | 8/2006 | Dambach et al. |
| 2006/0218503 A1* | 9/2006 | Matthews ............... G06F 9/4443 715/779 |
| 2006/0262140 A1 | 11/2006 | Kujawa et al. |
| 2007/0005747 A1* | 1/2007 | Batni et al. ............... 709/223 |
| 2007/0024644 A1* | 2/2007 | Bailey ............... 345/633 |
| 2007/0236502 A1* | 10/2007 | Huang ............... G06T 19/00 345/473 |
| 2007/0239211 A1* | 10/2007 | Lorincz et al. ............... 607/2 |
| 2007/0260669 A1* | 11/2007 | Neiman et al. ............... 709/201 |
| 2008/0094588 A1 | 4/2008 | Cole et al. |
| 2008/0151195 A1 | 6/2008 | Pacheco et al. |
| 2008/0174735 A1 | 7/2008 | Quach et al. |
| 2008/0180640 A1 | 7/2008 | Ito |
| 2008/0186255 A1* | 8/2008 | Cohen et al. ............... 345/8 |
| 2008/0229318 A1* | 9/2008 | Franke ............... 718/104 |
| 2008/0273754 A1 | 11/2008 | Hick et al. |
| 2008/0301175 A1* | 12/2008 | Applebaum ........ G06F 17/3051 |
| 2008/0320482 A1* | 12/2008 | Dawson ............... G06F 9/5027 718/104 |
| 2009/0031221 A1* | 1/2009 | Hookham-Miller G06F 17/30056 715/730 |
| 2009/0066805 A1 | 3/2009 | Fujiwara et al. |
| 2009/0073034 A1* | 3/2009 | Lin ............... 342/357.07 |
| 2009/0132953 A1* | 5/2009 | Reed, Jr. ............... G06F 3/0481 715/781 |
| 2009/0184888 A1 | 7/2009 | Chen et al. |
| 2009/0323097 A1* | 12/2009 | Iizuka ............... H04N 1/4406 358/1.14 |
| 2010/0011637 A1 | 1/2010 | Zhang |
| 2010/0026479 A1 | 2/2010 | Tran |
| 2010/0039568 A1 | 2/2010 | Tchoukaleysky |
| 2010/0060723 A1 | 3/2010 | Kimura et al. |
| 2010/0066676 A1 | 3/2010 | Kramer et al. |
| 2010/0164990 A1* | 7/2010 | Van Doorn ............... 345/633 |
| 2010/0199232 A1 | 8/2010 | Mistry et al. |
| 2010/0207872 A1 | 8/2010 | Chen et al. |
| 2010/0228632 A1* | 9/2010 | Rodriguez ............... 705/14.66 |
| 2010/0240455 A1 | 9/2010 | Gagner et al. |
| 2010/0253541 A1 | 10/2010 | Seder et al. |
| 2010/0257252 A1* | 10/2010 | Dougherty et al. .......... 709/217 |
| 2010/0281095 A1* | 11/2010 | Wehner ............... G06F 9/5072 709/201 |
| 2010/0284055 A1 | 11/2010 | Kothari et al. |
| 2010/0322469 A1* | 12/2010 | Sharma ............... 382/100 |
| 2011/0010222 A1* | 1/2011 | Choudhary ............ G06Q 10/06 705/7.37 |
| 2011/0012925 A1 | 1/2011 | Luo |
| 2011/0050885 A1 | 3/2011 | McEldowney |
| 2011/0061100 A1* | 3/2011 | Mattila et al. ............... 726/17 |
| 2011/0072047 A1 | 3/2011 | Wang et al. |
| 2011/0087731 A1* | 4/2011 | Wong et al. ............... 709/204 |
| 2011/0093094 A1 | 4/2011 | Goyal et al. |
| 2011/0096844 A1 | 4/2011 | Poupel et al. |
| 2011/0098056 A1* | 4/2011 | Rhoads et al. ............. 455/456.1 |
| 2011/0134204 A1 | 6/2011 | Rodriguez et al. |
| 2011/0154350 A1* | 6/2011 | Doyle et al. ............... 718/104 |
| 2011/0161912 A1* | 6/2011 | Eteminan et al. ........... 717/101 |
| 2011/0164163 A1 | 7/2011 | Bilbrey et al. |
| 2011/0178942 A1* | 7/2011 | Watters et al. ............... 705/325 |
| 2011/0197147 A1 | 8/2011 | Fai |
| 2011/0202847 A1* | 8/2011 | Dimitrov ............... G06F 3/0481 715/738 |
| 2011/0216090 A1 | 9/2011 | Woo et al. |
| 2011/0238751 A1 | 9/2011 | Belimpasakis et al. |
| 2011/0249197 A1 | 10/2011 | Sprowl et al. |
| 2011/0289308 A1* | 11/2011 | Sobko ............... G06F 21/56 713/100 |
| 2012/0009874 A1 | 1/2012 | Kiukkonen et al. |
| 2012/0120296 A1 | 5/2012 | Roberts et al. |
| 2012/0124245 A1 | 5/2012 | Reeves et al. |
| 2012/0127320 A1 | 5/2012 | Balogh |
| 2012/0130513 A1 | 5/2012 | Hao et al. |
| 2012/0223885 A1 | 9/2012 | Perez |
| 2012/0306878 A1 | 12/2012 | Wang et al. |
| 2013/0235354 A1 | 9/2013 | Kilcher et al. |
| 2013/0300637 A1 | 11/2013 | Smits et al. |
| 2014/0125649 A1* | 5/2014 | Carlin ............... G06F 17/30061 345/419 |

OTHER PUBLICATIONS

Office action for U.S. Appl. No. 12/977,760, mailed on Oct. 15, 2012, Worley, III et al., "Generation and Modulation of Non-Visible Structured Light", 13 pages.

Office action for U.S. Appl. No. 12/982,519, mailed on Feb. 7, 2013, Worley III , "Complementing Operation of Display Devices in an Augmented Reality Environment", 13 pages.

Office Action for U.S. Appl. No. 12/977,949, mailed on Jan. 22, 2014, William Spencer Worley III, "Powered Augmented Reality Projection Accessory Display Device", 11 pages.

Office Action for U.S. Appl. No. 12/977,924, mailed on Nov. 15, 2013, Coley, et al., "Characterization of a Scene With Structured Light", 9 pages.

Office Action for U.S. Appl. No. 13/236,294, mailed on Nov. 7, 2013, Christopher Coley, "Optical Interference Mitigation", 12 pages.

(56) References Cited

OTHER PUBLICATIONS

Office Action for U.S. Appl. No. 12/982,457, mailed on Dec. 3, 2013, William Spencer Worley III, "Utilizing Content Output Devices in an Augmented Reality Environment", 56 pages.
Office Action for U.S. Appl. No. 12/982,519, mailed on Feb. 12, 2014, William Spencer Worley III, "Complementing Operation of Display Devices in an Augmented Reality Environment", 12 pages.
Office Action for U.S. Appl. No. 12/977,760, mailed on Jun. 4, 2013, Worley III et al., "Generation and Modulation of Non-Visible Structured Light", 12 pages.
Office Action for U.S. Appl. No. 12/982,519, mailed on Aug. 29, 2013, Worley III, "Complementing Operation of Display Devices in an Augmented Reality Environment", 12 pages.
Sneath, "The Bumper List of Windows 7 Secrets", retrieved on Aug. 21, 2013, at <<http://blogs.msdn.com/b/tims/archive/2009/01/12/the_bumper-list-of-windows-7-secrets.aspx>>, Jan. 13, 2009, 13 pages.
Final Office Action for U.S. Appl. No. 13/236,294, mailed on Mar. 13, 2014, Christopher Coley, "Optical Mitigation", 14 pages.
Office Action for U.S. Appl. No. 12/975,175, mailed on Apr. 10, 2014, William Spencer Worley III, "Designation of Zones of Interest Within an Augmented Reality Environment", 33 pages.
Office Action for U.S. Appl. No. 12/977,992, mailed on Apr. 4, 2014, William Spencer Worley III, "Unpowered Reality Projection Accessory Display Device", 6 pages.
Final Office Action for U.S. Appl. No. 12/982,457, mailed on May 8, 2014, William Spencer Worley III, "Utilizing Content Output Devices in an Augmented Reality Environment", 58 pages.
Foscam User Manual, Model:F19821W, retrieved at <<http://foscam.us/downloads/Fl9821W%20user%20manual.pdf>>, May 2010, pp. 45-46 (71 pages).

Office Action for U.S. Appl. No. 12/975,175, mailed on Oct. 1, 2014, William Spencer Worley III, "Designation of Zones of Interest Within an Augmented Reality Environment", 36 pages.
Office Action for U.S. Appl. No. 12/977,760, mailed on Oct. 16, 2014, William Spencer Worley III, "Generation and Modulation of Non-Visible Structured Light", 11 pages.
Office Action for U.S. Appl. No. 12/982,457, mailed on Oct. 8, 2014, Worley III et al., "Utilizing Content Output Devices in an Augmented Reality Environment", 62 pages.
Office Action for U.S. Appl. No. 12/982,519, mailed on Aug. 14, 2014, Worley III, "Complementing Operation of Display Devices in an Augmented Reality Environment", 12 pages.
Office Action for U.S. Appl. No. 12/982,519, mailed on Mar. 5, 2015, William Spencer Worley III, "Complementing Operation of Display Devices in an Augmented Reality Environment", 13 pages.
Office Action for U.S. Appl. No. 13/236,294, mailed on Oct. 22, 2014, Christopher Coley, "Optical Interference Mitigation", 20 pages.
Final Office Action for U.S. Appl. No. 12/982,457, mailed on Apr. 8, 2015, William Spencer Worley III, "Utilizing Output Devices in an Augmented Reality Environment", 64 pages.
Office Action for U.S. Appl. No. 14/498,590 mailed on Oct. 7, 2015, Worley III et al., "Powered Augmented Reality Projection Accessory Display Device", 7 pages.
Office Action for U.S. Appl. No. 12/982,519, mailed on Jul. 23, 2015, Worley III, "Complementing Operation of Display Devices in an Augmented Reality Environment", 18 pages.
Office Action for U.S. Appl. No. 12/982,457, mailed on Sep. 10, 2015, Worley III, "Utilizing Content Output Devices in an Augmented Reality Environment", 77 pages.
Office Action for U.S. Appl. No. 12/982,519, mailed on Dec. 31, 2015, Worley III, "Complementing Operation of Display Devices in an Augmented Reality Environment", 26 pages.

* cited by examiner

INTEGRATED AUGMENTED REALITY ENVIRONMENT

BACKGROUND

Augmented reality environments allow users, real-world objects and virtual or computer-generated objects and information to interact with one another. These interactions may include verbal, physical, or other input signals made within a scene, such as a room or a workspace. Augmented reality environments may be computationally intensive to maintain. Furthermore, the variable nature of augmented reality environments poses challenges for developers when creating augmented reality applications. What is desired is an integrated augmented reality environment to ease development, deployment, and operation of augmented reality applications.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
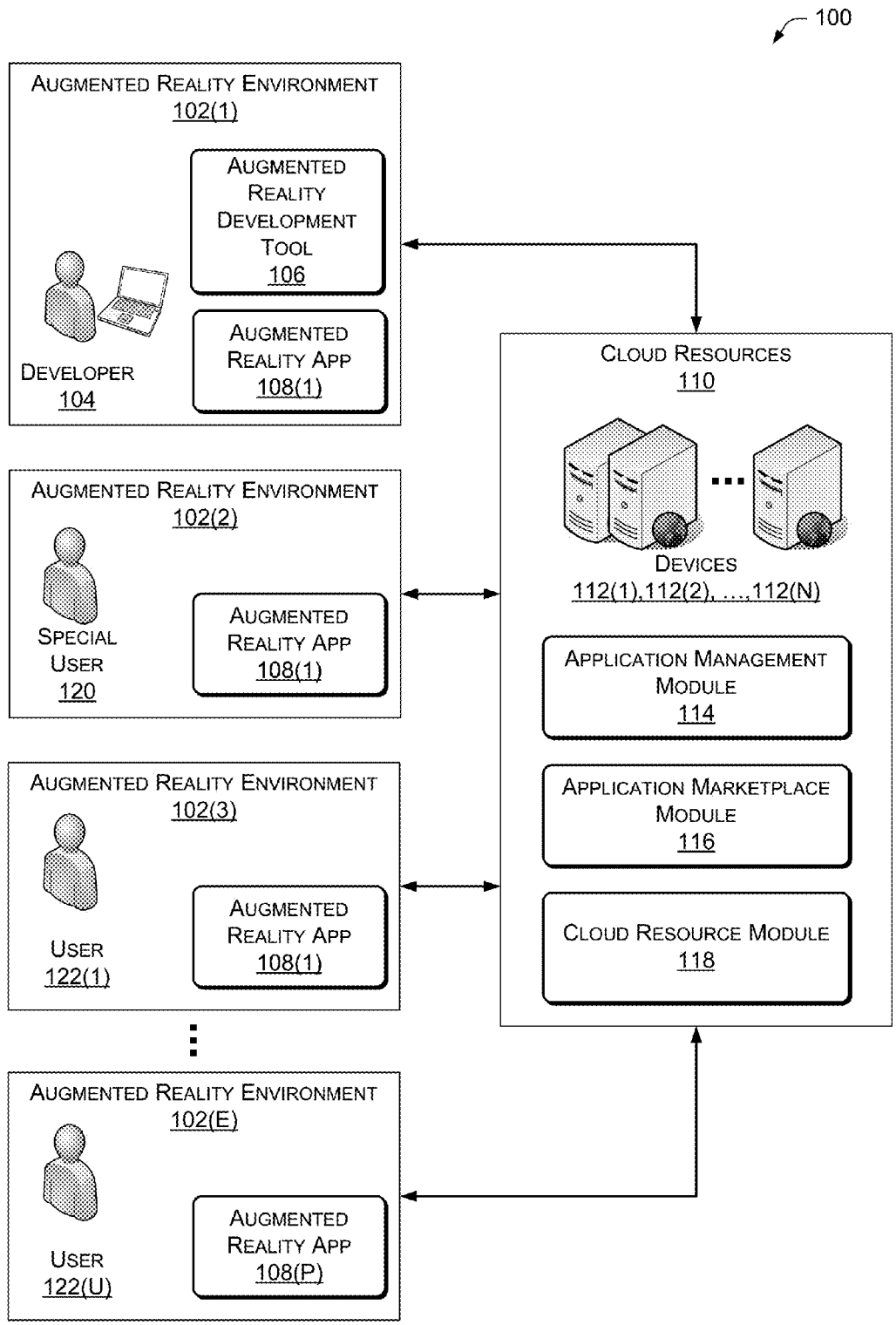
FIG. 1 illustrates an ecosystem comprising augmented reality environments, developers, users, and cloud resources to manage and maintain the ecosystem.

Augmented reality environments provide a way for users, physical objects, and virtual objects to interact in a physical space. Augmented reality environments may be resource intensive. These resources may include input/output resources such as cameras and projectors, compute resources, memory resources, and so forth. Furthermore, resource usage may vary depending upon changes in the augmented reality environment. For example, during a party or conference, multiple people in a room equipped to provide an augmented reality environment may call for services such as data display, virtual object manipulation, image overlays on physical objects, and so forth. Each service may comprise one or more tasks, such as projecting an image, processing data, generating speech, and so forth.

Described in this disclosure are devices and techniques for supporting an augmented reality ecosystem composed of individual augmented reality environments coupled to cloud resources. The augmented reality environments themselves comprise augmented reality devices which generate and support the augmented reality. For example, an augmented reality functional node (ARFN) may comprise an onboard computing device, camera, and projector configured to assess the scene with structured light and present data to the user. Assessment of the scene may also be accomplished using several other technologies including light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. Augmented reality applications are configured to use these augmented reality devices during execution, as well as accessing cloud resources. In some implementations, the ecosystem may comprise a peer-to-peer arrangement.

The tasks to support the augmented reality environment may be distributed amongst available resources located within or coupled to the augmented reality environment and disbursed to those resources. These resources include local device resources, local area network (LAN) local resources, and cloud resources. Tasks are assessed with task parameters such as priority, resource usage, special handling, response time budget and so forth. These assessments are used, at least in part, to determine how tasks are distributed among resources. Tasks may be distributed automatically, according to a pre-determined preferential resource hierarchy, pre-determined mapping, and so forth. Distribution of tasks may be specified at development time, during ingestion into the ecosystem, during runtime, or a combination of these. This distribution of tasks may be dynamic, responding to changes to the local area network, cloud resources, load on the augmented reality environment, and so forth. A given task may be distributed to one resource for processing, or across several resources for parallel processing.

A task resource interface, such as an application programming interface (API), may be used to seamlessly transfer tasks between the different resources. The application may thus utilize a task which executes using cloud resources as easily as if the task were executing on the local device.

Tasks which are distributed across lower bandwidth links, such as the WAN, may have associated data pre-processed prior to transmission across the lower bandwidth link. For example, raw data may be filtered, downsampled, compressed, and so forth. The degree to which data is pre-processed may be statically defined, or dynamically vary according to conditions. For example, when WAN bandwidth is high and latency is low, less pre-processing may occur than when the bandwidth is low and the latency high.

Development within the augmented reality ecosystem is facilitated by an augmented reality development tool. This tool allows for rapid development within augmented reality environments. Developers easily develop, test and refine augmented reality applications in an interactive fashion. Applications in development may use the task resource interface to access resources. A resource simulator may be provided to allow the developer to test the application in development with different augmented reality devices.

The tool may also be used to aid in maintaining a consistent user interface methodology across applications. Given the rich interaction capable in the augmented reality environment, consistent standards improve usability and minimize learning time and usage difficulties. For example, a particular gesture by a person in the augmented reality environment may be standardized to indicate a common function, such as summoning an active zone to accept more detailed inputs.

An application may be distributed to other users via the cloud resources which may be statically or dynamically provisioned. At ingestion the application may be checked for compliance with standards defined for the ecosystem, such as user interface, security, and so forth. Permissions are applied to the application, which may then be distributed to other users. Where the permissions are restricted, such as to a particular group of test users, standards may be relaxed compared to applications approved for distribution and use in any augmented reality environment. As augmented reality applications are updated, these updates may be made available and installed either on-demand or automatically to the augmented reality environments.

Illustrative Ecosystem

FIG. 1 illustrates an augmented reality ecosystem 100. One or more augmented reality environments, as represented by environments 102(1), 102(2), 102(3), . . . 102(E), may be provided as part of the ecosystem 100. Individual augmented reality environments 102(1)-(E) may comprise augmented reality devices, developers, users, applications, and communication links to other resources including cloud resources which maintain and manage the ecosystem 100.

A first augmented reality environment 102(1) represents a developer 104 using an augmented reality development tool 106 to build or maintain augmented reality applications 108(1), 108(2), . . . (P) for use by users in other augmented reality environments 102(2), 102(3), . . . , (E). While one developer 104 is shown for ease of illustration, it is understood that the ecosystem 100 may involve many developers 104(1), 104(2), . . . 104(D) working independently or in collaboration.

The augmented reality development tool 106 is configured to allow the seamless build and test of augmented reality applications 108(1)-(P) within the augmented reality environment 102. This ability to seamlessly build and test allows more rapid development and improves quality by allowing the developer 104 to easily experience the application 108 in an actual augmented reality environment 102. The augmented reality app 108 is a set of instructions or modules configured to provide some functionality within the augmented reality environment 102. For example, the augmented reality app 108(1) may be configured to receive command inputs from a user and transform spoken words into a presented stream of text. While the developer 104 finds the augmented reality development tool 106 convenient for use during development, in some implementations the developer 104 may choose to use other development tools or strategies.

The developer 104 may specify within the augmented reality application 108 particular devices or other applications within the augmented reality environment 102 required for operation. For example, a biomedical monitoring application may be configured to require an electrocardiogram interface device for operation.

While the augmented reality environment 102(1) may operate independently using locally available resources, the augmented reality environment 102 may participate in an overall augmented reality ecosystem by communicating with cloud resources 110. This communication may occur via a wired or wireless link such as a wide-area network (WAN). For example, as described below with regards to FIGS. 5-9, tasks in the augmented reality environment 102 may be distributed between local resources and cloud resources.

The cloud resources 110 provide shared resources accessible to many augmented reality environments 102. These cloud resources 110 act to support or extend the capabilities of the augmented reality environment 102. The cloud resources 110 may be supported or maintained by one or more devices 112(1), 112(2), . . . , 112(N) such as servers, storage devices, cryptographic processors, input/output devices, and so forth. Executing on one or more of these devices 112(N) is an application management module 114 configured to manage the augmented reality applications 108(1)-(P) in the ecosystem 100. This may include ingestion processing of augmented reality apps 108 submitted by developers 104, assignment and maintenance of access rights to augmented reality applications 108, and so forth. The developer 104, a system administrator, automated system, or a combination thereof may specify the access rights to the augmented reality application 108. For example, the developer 104 may allow a select group of users to access the application for testing. The developer 104 may also be able to specify trial or temporary access rights or licenses, allowing particular users to access the augmented reality application 108.

An application marketplace module 116 also executes on one or more of the devices 112(1)-(N) and provides functionality to allow users to find and access augmented reality applications 108 for use. Different filters may be used when presenting augmented reality applications 108 in the marketplace. For example, these filters may present approved applications to end-users, and beta or developmental applications to developers. The application marketplace module 116 may be configured to accept or confirm payment and in return provide the access to augmented reality applications 108(P).

A cloud resource module 118 executing on one or more of the devices 112 provides and manages cloud resources which are called by the augmented reality environments 102(1)-(E). The cloud resources may include datastores of information, processing capabilities, storage capabilities, input/output devices, and so forth. For example, the augmented reality app 108(1) which transforms spoken words in the augmented reality environment 102 into a stream of text for presentation may require additional computational resources to process words spoken with an accent unfamiliar to the local augmented reality devices. Audio of the spoken words may be transmitted to the cloud resource module 118 for processing. There, the larger computational and data resources of the cloud resource module 118 are able to recognize the accent and transform the words into text, which is returned to the augmented reality environment 102 for use. Cloud resources may also include one or more crowdsourcing marketplaces to complete human intelligence tasks. One example of a crowdsourcing marketplace is the Mechanical Turk™ crowdsourcing service provided by Amazon, Inc.

In a second augmented reality environment 102(2), a special user 120 has been granted access rights to use the augmented reality application 108(1) created by the developer 104. The special user 120 may then execute the augmented reality application 108(1) within her augmented reality environment 102(2). One or more of the special users 120 may be given access rights to augmented reality applications 108 which are not made generally available by the application marketplace module 116. For example, the developer 104 may be building an augmented reality application for the special user 120 as a gift. The application management module 114 may limit access to this application to the special user 120. In some implementations, the application with limited distribution may not be visible to the general population of users via the application marketplace module 116.

A third augmented reality environment 102(3) represents a generic user 122 who has accessed the application marketplace module 116 and acquired access rights to the augmented reality application 108(1). The user 122 may now use the augmented reality application 108(1) in his augmented reality environment 102(3). Other users 122(2), 122(3), . . . 122(U) may access the augmented reality applications 108(1), 108(2), . . . 108(P) in other augmented reality environments 102(1)-(E).

An augmented reality environment 102 may also have access to multiple augmented reality applications 108, and may execute them at the same time. For example, an application to transcribe spoken text and present it in a virtual window may be running contemporaneously with an application which provides tracking information about children in other rooms of the home.

Data may also be exchanged between augmented reality applications 108(P). For example, data from the augmented reality application 108(1) which is executing in the augmented reality environment 102(2) may be shared or otherwise accessible to the augmented reality environment 102(3). This data may be accessible to all users in the ecosystem 100, or secured and maintained for limited or restricted use to specified users. Shared data may be stored within the cloud resources 110. Securing the data may comprise encryption, limiting storage of data to devices local to the augmented reality environment 102, and so forth. The users, application management module 114, or a combination thereof may specify access rights to the data. The users may also receive reports and statistics about usage, manage access rights, and so forth.

Figure 2:
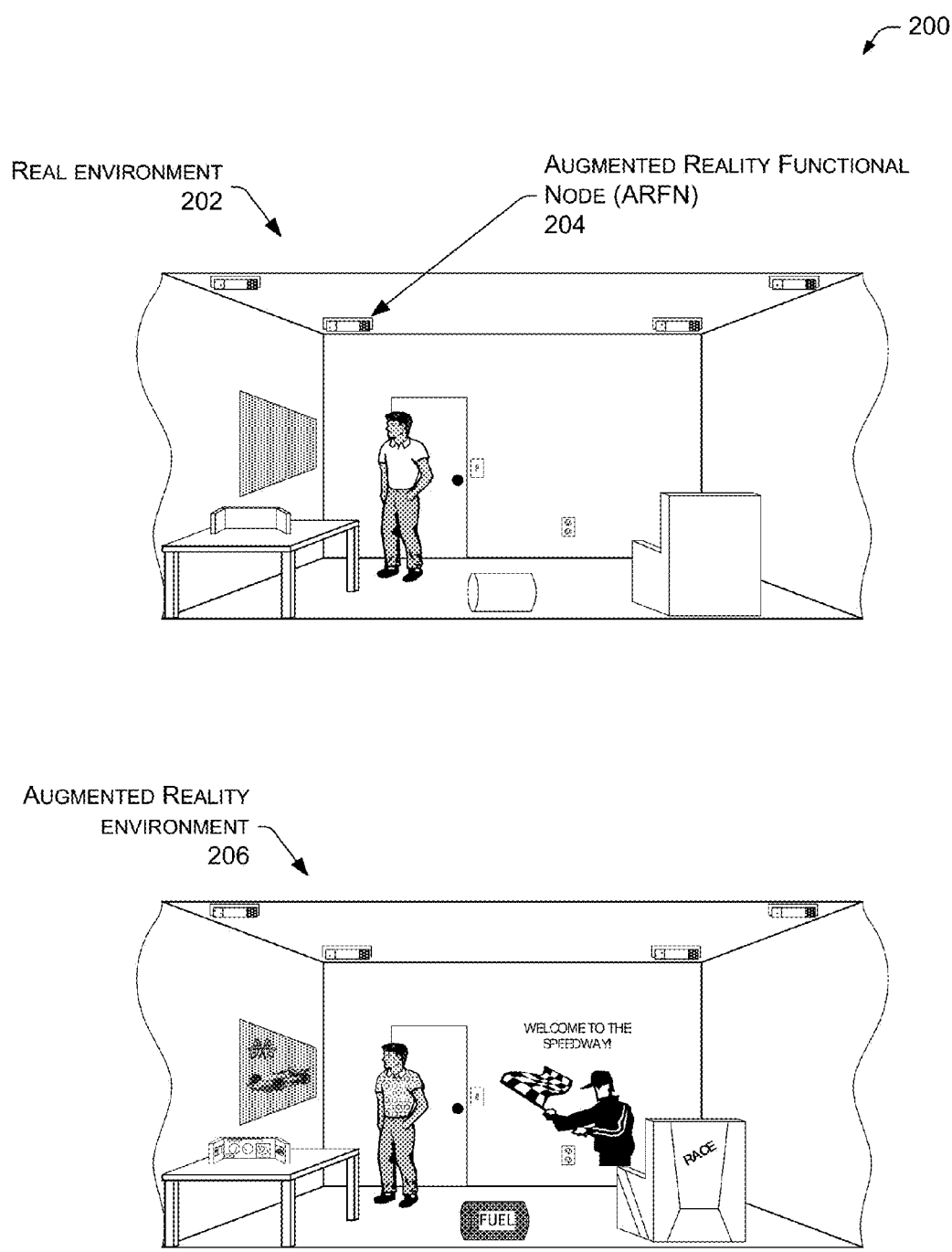
FIG. 2 illustrates an augmented reality environment superimposed on a scene.

FIG. 2 illustrates a scene 200 with and without the augmented reality environment 102 superimposed. A first view at 202 shows the real physical environment of the room which bounds the scene. Disposed within this environment are one or more augmented reality functional nodes (ARFNs) 204. As shown here, four ARFNs are mounted on a ceiling of the room. In other implementations the ARFN 102 may be positioned in other locations within the environment. The ARFNs 204 may provide input, output, processing, and other functions which support an augmented reality environment. The ARFNs 204 are discussed below in more detail in FIG. 3.

The augmented reality environment 102 allows physical objects such as tables, chairs, users, and so forth to interact with virtual objects. A second view at 206 depicts the scene with the augmented reality environment 102 engaged. In this example, the augmented reality environment is configured to provide an experience associated with automotive racing. The appearance of several objects within the scene has been altered and the user, and their behaviors in this augmented reality environment are enhanced. For example, the user may pick up the cylinder which was featureless in view 202 but now appears to be a "fuel" container in view 206, and use it to add fuel to a virtual race car. Sensors in the environment detect the actions of the user picking up and manipulating the cylinder and process these actions as input to the augmented reality environment.

Figure 3:
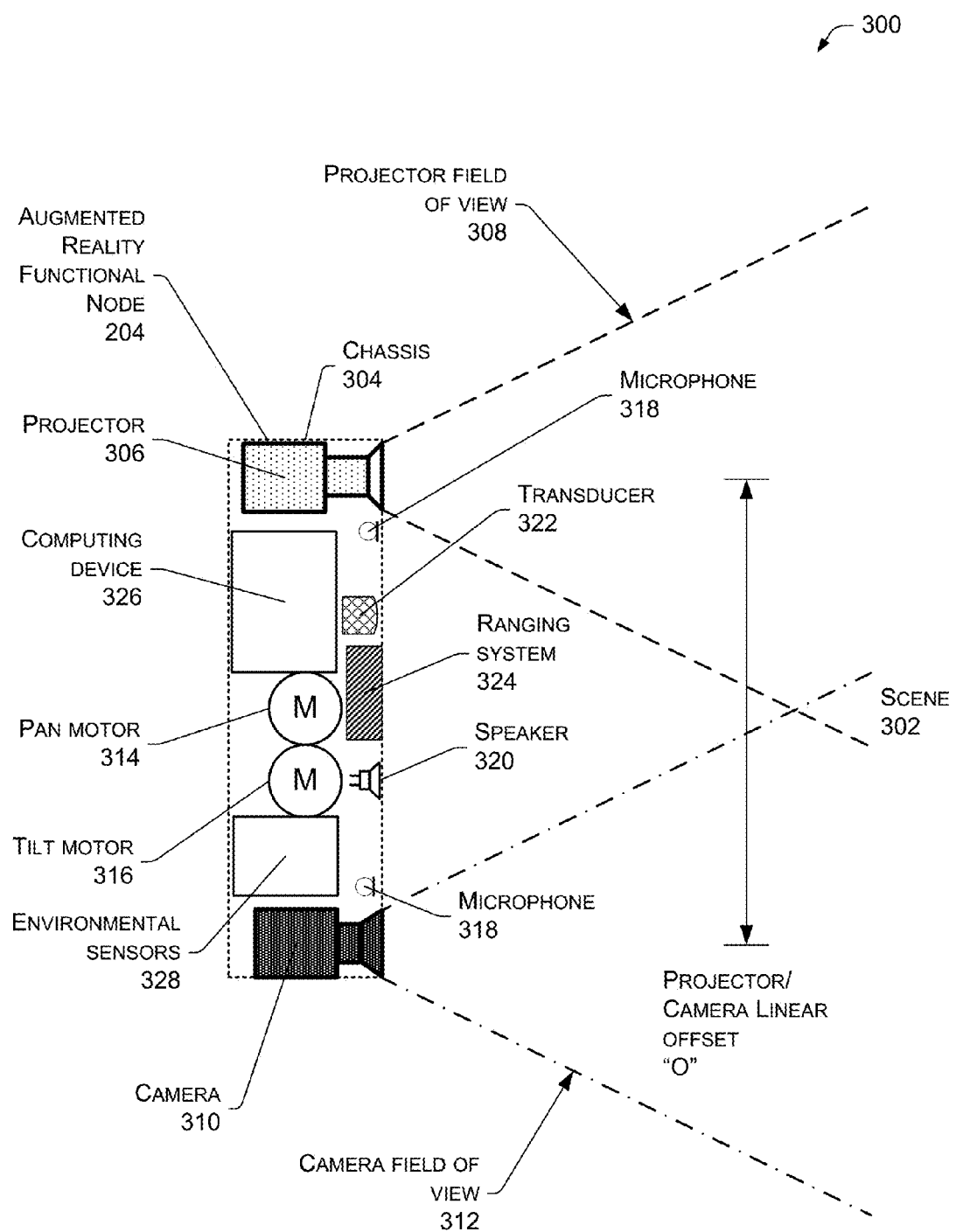
FIG. 3 illustrates components of an augmented reality functional node that may be used in the augmented reality environment.

FIG. 3 illustrates components 300 of an augmented reality functional node (ARFN) that may be used in the augmented reality environment. The ARFN 204 is configured to scan at least a portion of a scene 302 and the objects therein. The ARFN 204 may also be configured to provide output. The sensors and modules within the ARFN 204 characterize the scene as described herein.

Disposed within the chassis 304 is a projector 306 that generates and projects images into the scene 302. These images may be visible light images perceptible to the user, visible light images imperceptible to the user, images with non-visible light, or a combination thereof. This projector 306 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 306 has a projector field of view 308 which describes a particular solid angle. The projector field of view 308 may vary according to changes in the configuration of the projector. For example, the projector field of view 308 may narrow upon application of an optical zoom to the projector. In some implementations, a plurality of projectors 306 may be used.

A camera 310 may also be disposed within the chassis 304. The camera 310 is configured to image the scene in visible light wavelengths, non-visible light wavelengths, or both. The camera 310 has a camera field of view 312 which describes a particular solid angle. The camera field of view 312 may vary according to changes in the configuration of the camera 310. For example, an optical zoom of the camera may narrow the camera field of view 312. In some implementations a plurality of cameras 310 may be used.

The chassis 304 may be mounted with a fixed orientation or be coupled via an actuator to a fixture such that the chassis 304 may move. Actuators may include piezoelectric actuators, motors, linear actuators, and other devices configured to displace or move the chassis 304 or components therein such as the projector 306 and/or the camera 310. The actuator may comprise a pan motor 314, tilt motor 316, and so forth. The pan motor 314 is configured to rotate the chassis 304 in a yawing motion. The tilt motor 316 is configured to change the pitch of the chassis 304. By panning and/or tilting the chassis 304, different views of the scene may be acquired.

One or more microphones 318 may be disposed within the chassis 304, or elsewhere within the scene. These microphones 318 may be used to acquire input from the user, for echolocation, location determination of a sound, or to otherwise aid in the characterization of and receipt of input from the scene. For example, the user may make a particular noise such as a tap on a wall or snap of the fingers to initiate an augmented reality function. The user may alternatively use voice commands. Such audio inputs may be located within the scene using time-of-arrival differences among the microphones and used to summon an active zone within the augmented reality environment for input.

One or more speakers 320 may also be present to provide for audible output. For example, the speakers 320 may be used to provide output from a text-to-speech module or to playback pre-recorded audio.

A transducer 322 may be present within the ARFN 204, or elsewhere within the environment, and configured to detect and/or generate inaudible signals, such as infrasound or ultrasound. These inaudible signals may be used to provide for signaling between accessory devices and the ARFN 204, for echolocation, and so forth.

A ranging system 324 may also be provided in the ARFN 204. The ranging system 324 is configured to provide distance information from the ARFN 204 to a scanned object or set of objects. The ranging system 324 may comprise radar, light detection and ranging (LIDAR), ultrasonic ranging, stereoscopic ranging, and so forth. In some implementations the transducer 322, the microphones 318, the speaker 320, or a combination thereof may be configured to use echolocation or echo-ranging to determine distance and spatial characteristics.

In this illustration, a computing device 326 is shown within the chassis 304. The computing device 326 may comprises a processor, an input/output interface, and a memory. The processor may comprise one or more processors configured to execute instructions. The instructions may be stored in the memory, or in other memory accessible to the processor.

The input/output interface may be configured to couple the computing device 326 to other components such as a projector and a camera, to other ARFNs 204, networks, other computing devices, and so forth. The coupling between the computing device 326 and the components may be via wire, fiber optic cable, wireless, or other connections. Furthermore, as described in more detail below, additional resources external to the ARFN 204 may be accessed, such as resources in another ARFN 204 accessible via a local area network, cloud resources accessible via a wide area network connection, or a combination thereof As used throughout this disclosure, the memory may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instruction, datastores, and so forth may be stored within the memory and configured to execute on a processor, such as the processor. An operating system module is configured to manage hardware and services within, and coupled to, the computing device 326 for the benefit of other modules.

These modules may include a spatial analysis module configured to perform several scene characterization functions. These functions may include analyzing a topology of the scene, recognizing objects in the scene, dimensioning the objects, and modeling the scene. Characterization may be accomplished using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light.

A system parameters datastore is configured to maintain information about the state of the computing device, the input/output devices of the ARFN 204, and so forth. For example, system parameters in the datastore may include current pan and tilt settings of the camera(s) and projector(s). As used throughout this disclosure, datastore includes lists, arrays, databases, and other data structures used to provide storage and retrieval of data.

An object parameters datastore in the memory is configured to maintain information about the state of objects within the scene. This information may be acquired via sensors in the ARFN 204, from other input devices, or via manual input. For example, the object parameters may include the surface contour of the object and the overall reflectivity determined from the object's interaction with the structured light pattern.

An object datastore is configured to maintain information about objects for use by the spatial analysis module. This information may include assumptions about the object, dimensions, and so forth. For example, the object datastore may include a reference object of a beverage can and include the assumptions that beverage cans are either held by a user or sit on a surface, and are not present on walls or ceilings. The spatial analysis module may use this data maintained in the datastore to test dimensional assumptions when determining the dimensions of objects within the scene. The object datastore may include a library of pre-loaded reference objects, as well as objects which are temporally persistent within a particular environment, such as a wall, particular table, user and so forth. The object datastore may be stored locally in the memory of the computing device 326, in an external storage device on the network, in the cloud resources 110, or a combination thereof.

Object data may also be transferred between object datastores on different devices. For example, data about objects in the augmented reality environment 102 which is stored in a local object data store may be transferred to an object datastore in the cloud resources 110. In this way, the object datastore in the cloud resource may be improved to provide a large catalog of real-world objects.

An augmented reality module is configured to generate augmented reality output in concert with the physical environment. For example, the augmented reality module may be configured to project a virtual image onto a wall which tracks and follows the user who initiated the presentation of the image. The augmented reality module may access input/output devices within one or more ARFN nodes 204 to generate output and receive input.

Also shown in this illustration is a projector/camera linear offset designated "O". This is a linear distance between the projector 306 and the camera 310. Placement of the projector 306 and the camera 310 at distance "O" from one another aids in the recovery of structured light data from the scene. The known projector/camera linear offset "O" may also be used to calculate distances, dimension objects, and otherwise aid in the characterization of objects within the scene 302. In other implementations the relative angle and size of the projector field of view 308 and camera field of view 312 may vary. Also, the angle of the projector 306 and the camera 310 relative to the chassis 304 may vary.

The ARFN 204 may also include environmental sensors 328. These environmental sensors 328 may include detectors for temperature, humidity, barometric, suspended particulate matter, ionization, and so forth. In some implementations, data from these detectors may be used to adjust the interpretation of data received from other sensors. For example, where audio signals are located based upon time of flight, temperature and humidity data from the environmental sensors 328 may be used to provide more accurate calculations.

In other implementations the components of the ARFN 204 may be distributed in one or more locations within the scene. As mentioned above, microphones 318 and speakers 320 may be distributed throughout the scene. The projector 306 and the camera 310 may also be located in separate chassis 204.

Figure 4:
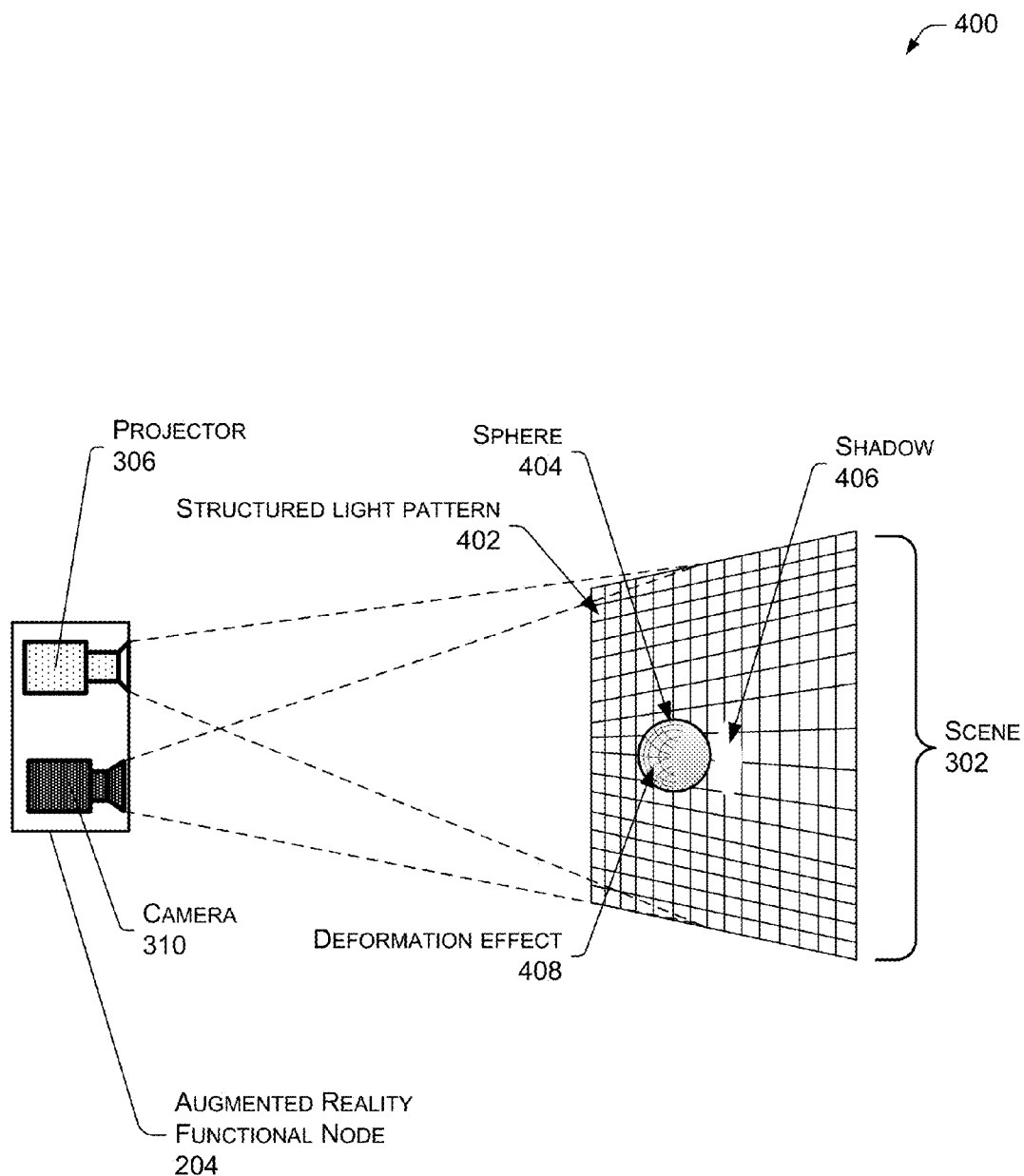
FIG. 4 illustrates the augmented reality functional node projecting a structured light pattern on the scene and receiving a corresponding image of the scene.

FIG. 4 illustrates the ARFN 204 projecting a structured light pattern on the scene and receiving a corresponding image 300 of the scene. The projector 306 within the ARFN 204 projects a structured light pattern 402 onto the scene 302. In other implementations, other devices such as general room lighting may generate structured light patterns. A light fixture, bulb, and so forth may be configured such that emitted light contains one or more modulated structured light patterns 402. For example, two structured light patterns may be presented, each at a different non-visible wavelength within the structure of an incandescent bulb.

In some implementations data to be received by objects within the scene may be embedded in the structured light pattern 402. For example, portable devices within the scene may receive commands to generate haptic output via modulation of the light emitted by the projector 306. The cameras 310 used to detect the structured light may also be incorporated into bulbs or assemblies suitable for installation in existing light fixtures. These assemblies may be configured to communicate with the computing device 326 wirelessly or via transmission of a signal via the household electrical wiring. In some implementations, the assembly may provide pre-processing of input prior to sending data along to the computing device 326.

This structured light pattern 402 may be in wavelengths which are visible to the user, non-visible to the user, or a combination thereof. The structured light pattern 402 is shown in this example as a grid for ease of illustration and not as a limitation. In other implementations other patterns, such as bars, dots, pseudorandom noise, and so forth may be used. Pseudorandom noise (PN) patterns are useful as structured light patterns because a particular point within the PN pattern may be specifically identified. A PN function is deterministic in that given a specific set of variables, a particular output is defined. This deterministic behavior allows the specific identification and placement of a point or block of pixels within the PN pattern. In some implementations, a plurality of structured light patterns 402 may be used to image the scene. These may include different PN patterns, geometric shapes, and so forth.

A sphere 404 is shown positioned between the projector 306 and a wall in the scene 302. A shadow 406 from the sphere 404 appears on the wall. Inspection of the sphere 404 shows a deformation effect 408 of the structured light pattern 402 as it interacts with the curved surface of the sphere 404.

In some implementations other effects, such as dispersion of the structured light pattern 402 may be used to provide information on the topology of the scene. Where the projector 306 and camera 310 have differing fields of view, such as shown in FIG. 3, the dispersion or change in the "density" of the structured light pattern 402 may be used to determine depth of field.

The camera 310 detects the interaction of the structured light pattern 402 with objects within the scene. For example, the deformation effect 408 on the sphere 404 is detected by the camera 310. The camera 310 is configured to sense or detect the structured light. In some implementations the camera 310 may also sense or detect wavelengths other than those used for structured light pattern 402. The image captured by the camera 310 is processed by a processor such as the processor within the computing device 326 to characterize the scene 302.

The actual size of the sphere 404 in this example may not be readily determined based upon the geometry of the ARFN 204, diameter of the sphere 404, distance between the ARFN 204 and the sphere 404, and so forth. As a result, the augmented reality application 108 or another application supporting the augmented reality environment 102 may be configured to make one or more assumptions about the scene, and test those assumptions to constrain the dimensions of the scene 402.

As mentioned above, the structured light pattern 402 may be projected using light which is visible to the user, non-visible to the user, or a combination of the two. Where visible light is used, the presentation of the structured light pattern in visible light may be rendered imperceptible to the users. Non-visible light offers the advantage of allowing the structured light pattern 402 to be projected onto the scene and remaining undetectable to the user. Non-visible light, however, may require special equipment or adaptations to the equipment to generate and modulate the non-visible light. For example, an image projector may incorporate a color wheel with segments configured to pass infrared light as well as visible light wavelengths.

Figure 5:
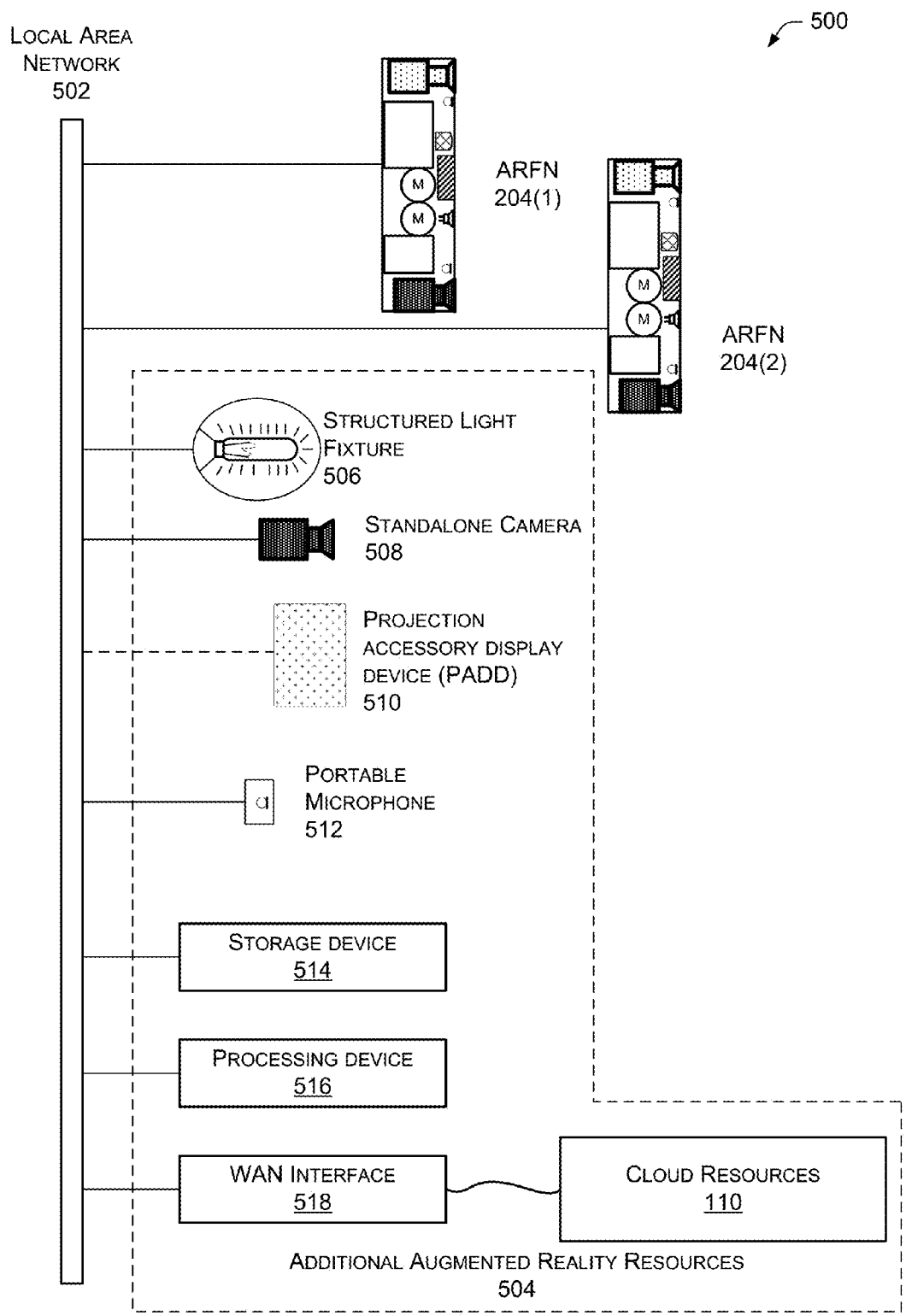
FIG. 5 illustrates devices within the augmented reality environment.

FIG. 5 illustrates devices 500 within the augmented reality environment. These devices and their various capabilities may be used to support and maintain the augmented reality environment 102. Each device may have one or more resources which may be shared within the augmented reality environment 102. For example, one device may have a particular camera, another device available information processing capacity, and so forth.

A local area network (LAN) 502 may couple the devices in the augmented reality environment 502. This LAN 502 may be wired or wireless using proprietary or standardized protocols. For example, the local network 502 may comprise Institute of Electrical and Electronic Engineers (IEEE) standards 802.3, 802.11n, and so forth. As used in this disclosure, wireless includes radio frequency, optical, magnetic, acoustic, or other methods of transferring data without a physical connection.

As described above, one or more ARFNs, as represented by ARFN 204(1) and 204(2), may couple to one another via the LAN 502. Also shown coupled to the LAN 502 are additional augmented reality resources 504. These resources 504 provide other functions within or in support of the augmented reality environment 102. A structured light fixture 506 is configured to generate structure light patterns for use in the characterization of the scene. A standalone camera 508 is also shown, which may be used to provide input for the augmented reality environment 102. A projection accessory display device (PADD) 510 may be provided to present a projected image, such as from the projector 306. The PADD 510 may be configured with inputs and functionality to relay that input via the LAN 502 or other communication channel to one or more processors within the augmented reality environment 102. Likewise, a portable microphone 512 may be configured to provide audio input for the augmented reality environment 102.

Additional augmented reality resources 504 may include a storage device 514 coupled to the LAN 502 and configured to provide data storage and retrieval. For example, the storage device 514 may be configured to store a local subset of the object datastore. A processing device 516 may couple to the LAN 502 and provide processing capabilities to the augmented reality environment 102 and applications 108 therein. For example, the processing device 516 may provide for dedicated graphics capabilities, cryptographic functions, general data processing, and so forth. A WAN interface 518 may couple to the LAN 502 and provide connectivity to a wide area network and resources such as the cloud resources 110. For example, the WAN interface 518 may comprise a cable modem, digital subscriber line mode, wireless wide-area network modem, router, and so forth.

Other devices may also be coupled to the LAN 502 to provide additional functions. The LAN 502 may be wired, wireless, or a combination thereof. For example, communication interfaces, display devices such as televisions, home and building automation controls, telephone network interfaces, and so forth.

Figure 6:
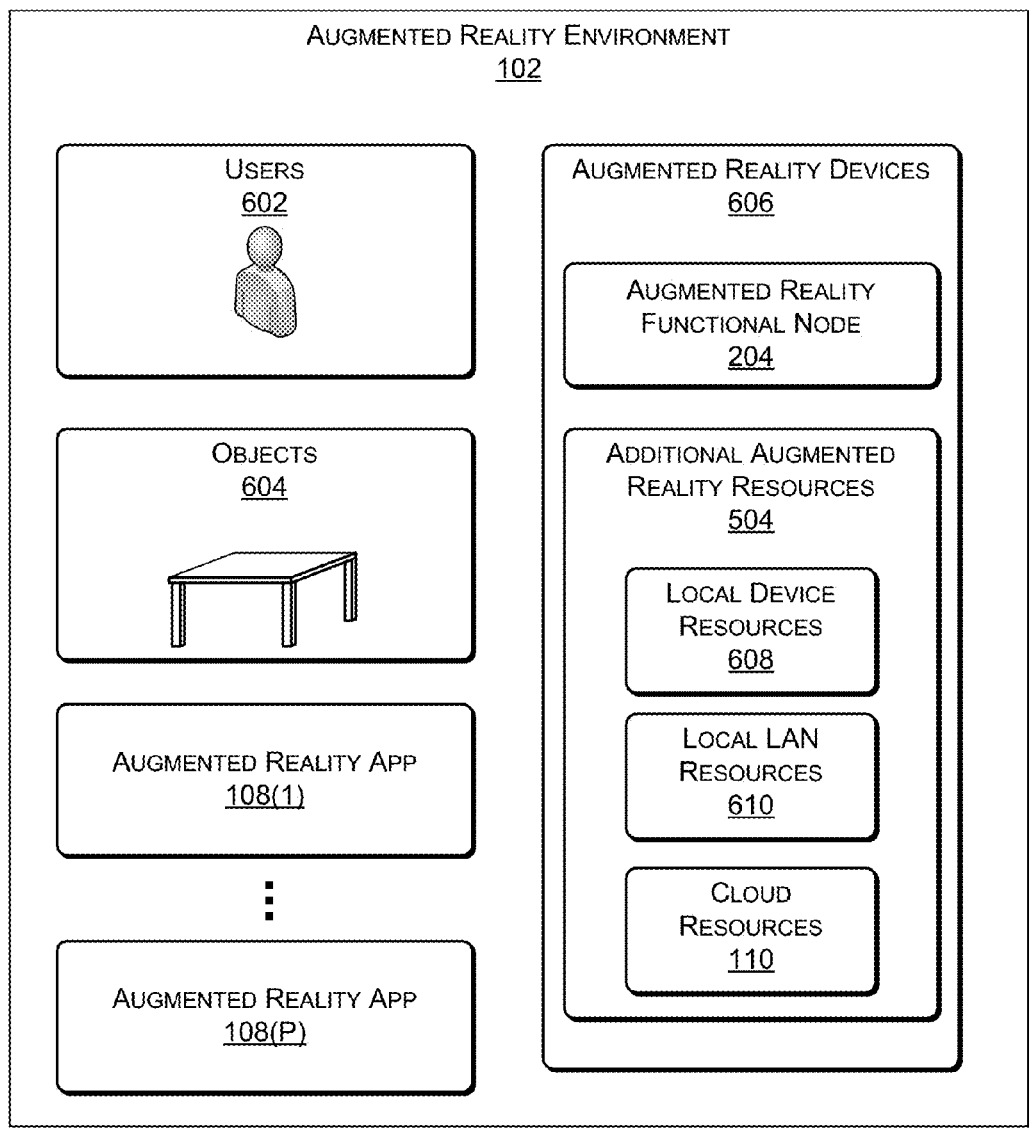
FIG. 6 illustrates the composition of an exemplary augmented reality environment.

FIG. 6 illustrates some elements of the augmented reality environment 102. Users 602, such as the developers 104, special users 120, or other users 122(U), are within and interacting with the augmented reality environment 102. These users 602 interact with objects 604 within the scene, such as the table, chair, wall, and cylindrical object of FIG. 4. One or more augmented reality applications 108(1)-(P) as described above may be executed and supported by augmented reality devices 606. As described above with regards to FIG. 5, these augmented reality devices 606 may include one or more ARFNs 204, as well as the additional augmented reality resources 504.

As discussed, the additional augmented reality resources 504 include local device resources 608, local LAN resources 610, and cloud resources 110. The local device resources 608 are those resources which are internal to a particular device, such as a particular ARFN. For example, the projector and processor within ARFN 204(1) are local device resources 608 for the ARFN 204(1). Local LAN resources 610 are those which are accessible via the LAN 502, such as other ARFNs 204, the storage device 512, processing device 516, and so forth. The LAN local itself may comprise a relatively high bandwidth and low latency connection compared to other connections such as the wide-area network link.

The cloud resources 110 are those which are accessible via a wide-area network link, such as provided by the WAN interface 518. As described above, the cloud resources 110 may include datastores, storage, compute resources, input/output resources, or other resources. These cloud resources 110 may be pooled and shared across many augmented reality environments 102(1)-(E), or designated to a particular augmented reality environment 102. For example, the developer 104 may have purchased special dedicated cloud resources, while the users 122(1)-(U) use cloud resources which may have variable availability.

Figure 7:
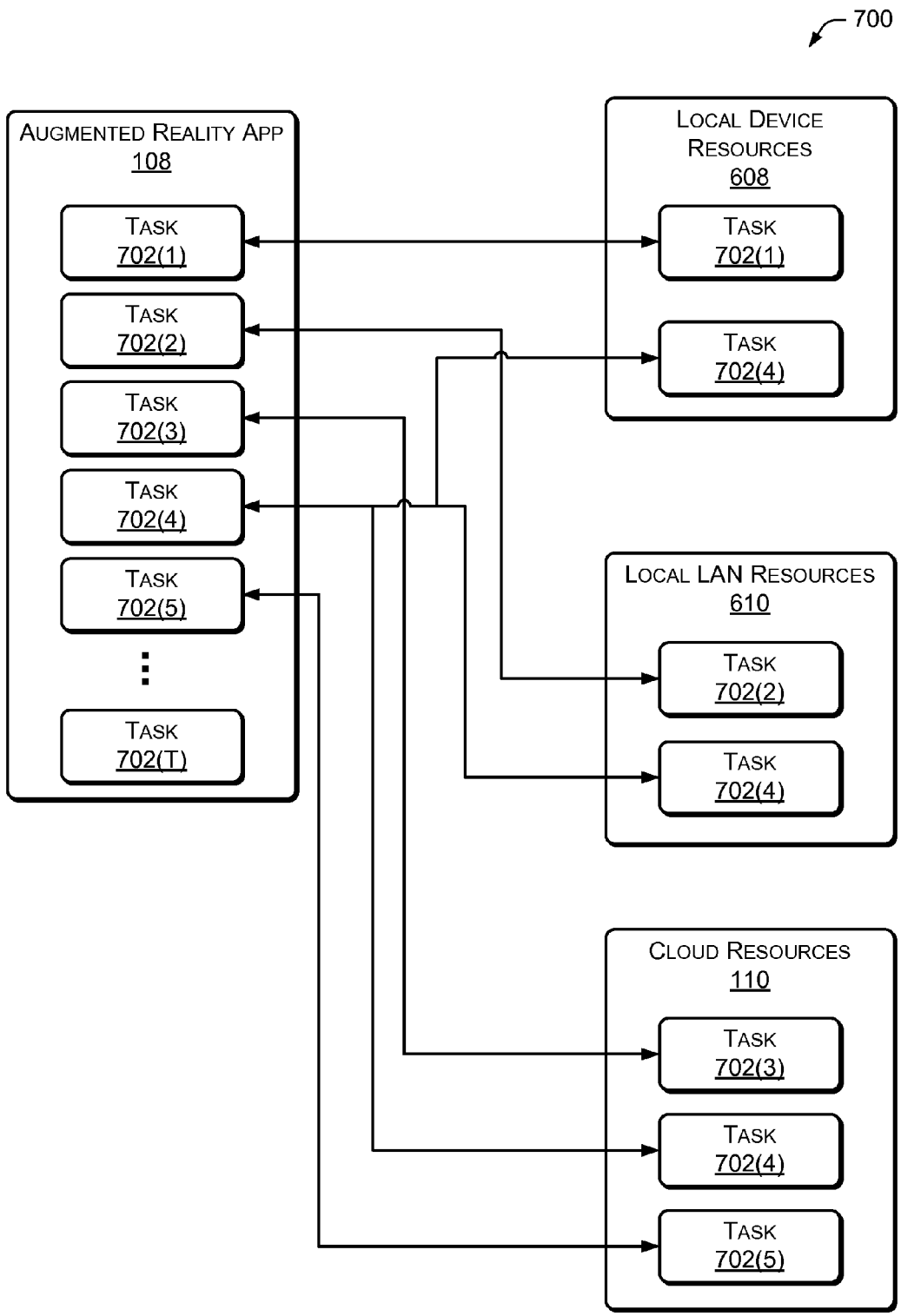
FIG. 7 illustrates the distribution of tasks within the augmented reality environment across resources that reside at a device, on the local area network, or in the cloud.

FIG. 7 illustrates the distribution of tasks 700 within the augmented reality environment 102 across resources within or coupled to the environment. In this illustration, consider that the augmented reality application 108 initiates tasks 702(1)-702(T) for completion during operation. These tasks are analyzed, distributed, and disbursed amongst local device resources 608, local LAN resources 610, and cloud resources 110. The analysis, distribution, and disbursement of tasks are described in more detail below with regards to FIG. 8.

As illustrated, task 702(1) is distributed to the local device resources 608, such as the processor within an ARFN 204 which contains the augmented reality application 108 or portion thereof which has initiated the tasks 702(1), 702(2), ..., 702(T). Task 702(2) is distributed to local LAN resources 610, while the cloud resources 110 handle task 702(3).

Tasks may be distributed to multiple resources for contemporaneous processing. As shown here, task 702(4) is distributed across the local device resources 608, local LAN resources 610, as well as the cloud resources 110. Consider our earlier example where the speech of a speaker with an unfamiliar accent is transformed into text. The voice recognition task for that accent may be split to minimize perceived latency to the user and still provide highly accurate results. For example, the local device resources 608 may process task 702(1) that determines vocal command inputs, while the processing device 516 on the local network attempts to perform task 702(4) to provide a more comprehensive analysis of the speech, and the cloud resources 110 handle task 702(4) as well to try and provide the definitive "cleanest" version of the recognized text using greater processing capacity and additional data pertaining to the accent. The rapid local device processing which is free from network latency issues allows for user commands to likely be recognized and acted upon quickly, improving the user experience. The local network processing provides additional details to provide an interim display of text until the definitive version is received from the cloud and merged into the data presented to the user.

In this illustration, the cloud resources 110 are also handling task 702(5). For example, task 702(5) may call for accessing a global object datastore to recover the details of a rare postal stamp within the scene which the user has requested an identification of Datastores within the memory of the local device such as the ARFN 204 and the storage device 514 may not contain the data for this particular rare stamp. As a result, the task of identifying and locating data associated with the rare stamp is sent to the greater cloud resources 110 for processing.

Figure 8:
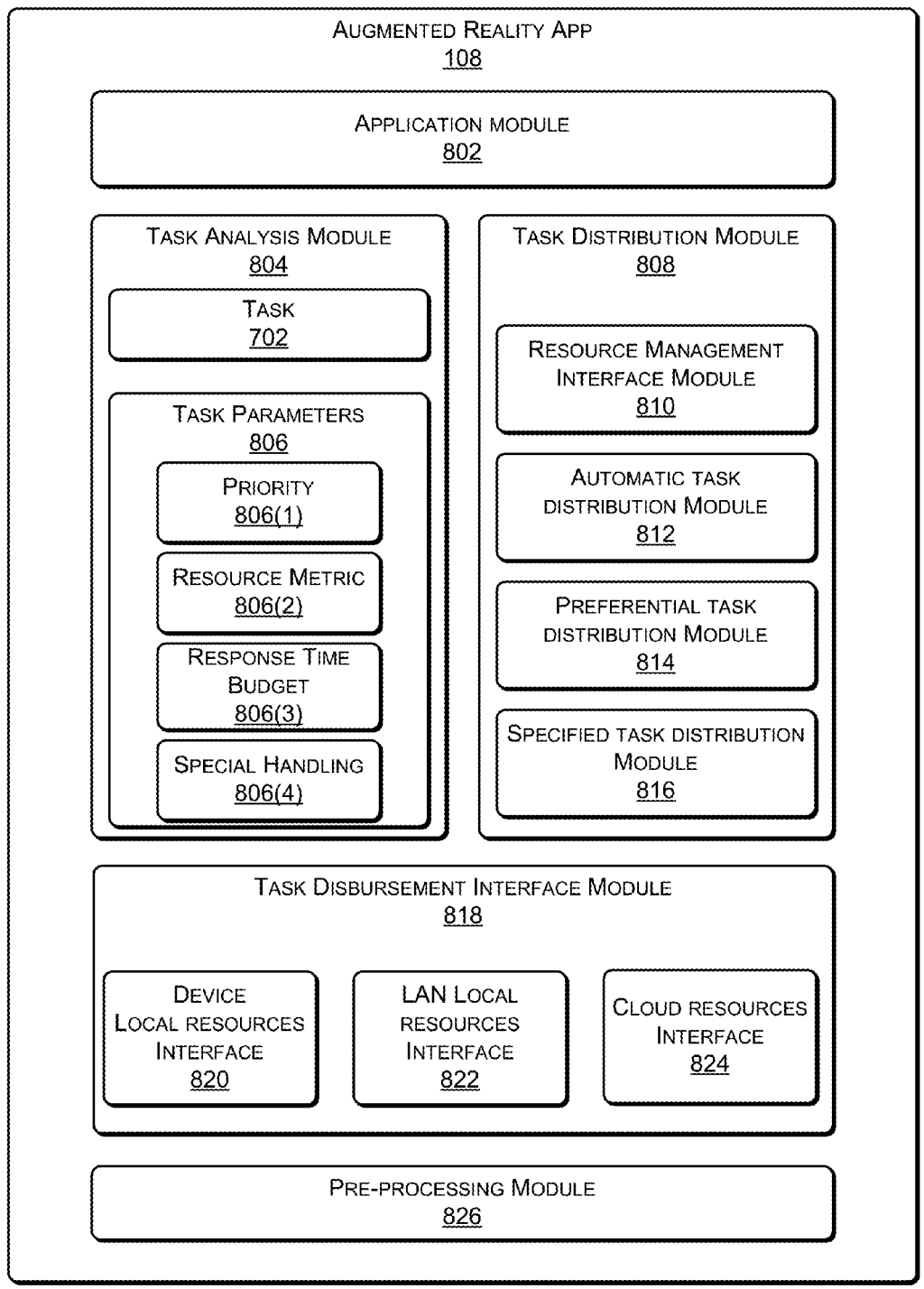
FIG. 8 illustrates modules of an augmented reality application.

FIG. 8 illustrates modules in an augmented reality application 108 configured to generate and handle the tasks of FIG. 7. The modules may be stored and executed in one or more locations, such as the ARFNs 204, the storage devices 514, the processing devices 516, the cloud resources 110 and so forth. The augmented reality application 108 provides functionality within the augmented reality environment 102. An application module 802 provides the core functionality of the application. For example, the application module 802 may be configured to recognize speech and present it as text in a virtual window on the wall.

During operation, the application module 802 initiates tasks 702(1)-(T) associated with input, output, data retrieval, data processing and so forth. For example, the tasks 702 may include receiving gesture input, presenting an image, retrieving data from a datastore, and so forth. A task analysis module 804 is configured to assess the task 702 and determine one or more task parameters 806. The task parameters 806 are used to characterize the task for distribution amongst resources. A priority 806(1) provides an indicator as to the relative importance for the task 702. For example, a task with a high priority 806(1) may be executed before a low priority task. A resource metric 806(2) indicates what type of resource is required and how much of that resource will be necessary. For example, a resource metric 806(2) may specify that the task 702 will require a 128 kbps audio stream from the microphone 218 closest in the scene to the user until further notice. The resource metric 806(2) may also comprise an estimated or actual time for the task to complete.

A response time budget 806(3) specifies an available window of time in which the task may be completed. For example, a response time budget 806(3) for a real-time interactive task such as updating a user interface may be about 30 ms.

A special handling 806(4) task parameter 806 allows for specification of particular conditions for handling the task. For example, the special handling 806(4) may indicate that the task 702 is handling sensitive data and is to be processed either locally or be encrypted before sending the task 702 to an external resource such as the cloud resources 110. In other implementations, other task parameters 806 may be used, such as a particular ARFN 102 associated with the task.

Once the task analysis module 804 has assessed the task 702, a task distribution module 808 determines where the task 702 will be completed. A resource management interface module 810 maintains information about resources available to the augmented reality environment 102. The resource information may be gathered from other devices via receipt of a broadcast, polling, retrieval from a management device, and so forth. The resource management interface module 810 may also be configured to access or track cost data regarding the use of resources, and operate within pre-defined limits. For example, the resource management interface module 810 may be configured to discontinue use of the cloud resources 110 when a pre-determined cost threshold has been reached.

An automatic task distribution module 812 leverages the task assessment from the task analysis module 804 and data from the resource management interface module 810 to distribute the task 702 without intervention. The automatic task distribution module 812 may be configured to use one or more heuristics to distribute the task 702 among the available resources. For example, the automatic task distribution module 812 may use data from the resource management interface module 810 to determine that ARFN 102(2) has excess computational resources while ARFN 102(3) has additional storage resources available. The tasks may then be distributed to take advantage of these available resources.

A preferential task distribution module 814 may be configured to distribute tasks according to a pre-determined preferential resource hierarchy. The developer 104, the user 122, or the application management module 114 may designate this hierarchy. For example, the developer 104 may choose to have a task involving image tracking as preferred to execute on the processing device 516 when available, otherwise find the best available resource.

A specified task distribution module 816 assigns the one or more tasks to one or more resources according to a pre-determined mapping. While the automatic and preferential task distribution allows some variance in where the task may execute, the pre-determined mapping does not. For example, the pre-determined mapping may require that all security-related functions of the computing device 326 be initiated and executed locally.

Once the tasks have been assigned by the task distribution module 808 to one or more resources, a task disbursement interface module 818 provides for the disbursement of those tasks to the resources and receipt of the results, if any. The task disbursement interface module 818 may comprise a device local resources interface 820, LAN local resources interface 822, cloud resources interface 824, as well as other resource interfaces. These resource interfaces provide for task disbursement and the handling of returned data without intervention by the application module 802. For example, during development of the augmented reality application 108, the developer 104 may build the application module 802 and utilize the automatic task distribution module 808. The developer 104 has no need to determine what resources may be available in a particular augmented reality environment, nor manage the handling of tasks which use those resources. As a result, the developer 104 may quickly and easily develop augmented reality apps 108 which are capable of seamlessly and effectively accessing the resources available to the augmented reality environment 102.

A pre-processing module 826 is configured to provide pre-processing to tasks or task-related data prior to disbursement. For example, in our example of the user's speech being transformed into presented text, the audio stream from the microphone 218 may be filtered to remove ambient noise and compressed to minimize bandwidth during transfer to the cloud resource 110.

In another implementation, the modules of the augmented reality application 108 may operate as standalone modules or a service or daemon executing on the devices in the augmented reality environment 102. For example, the operating system of the computing device 326 may incorporate the task analysis module 804, the task distribution module 808, the task disbursement interface module 818, the pre-processing module 826, or a combination thereof. In this implementation, the application module 802 may use a simplified interface to pass tasks to the operating system for analysis, distribution, and disbursement.

Figure 9:
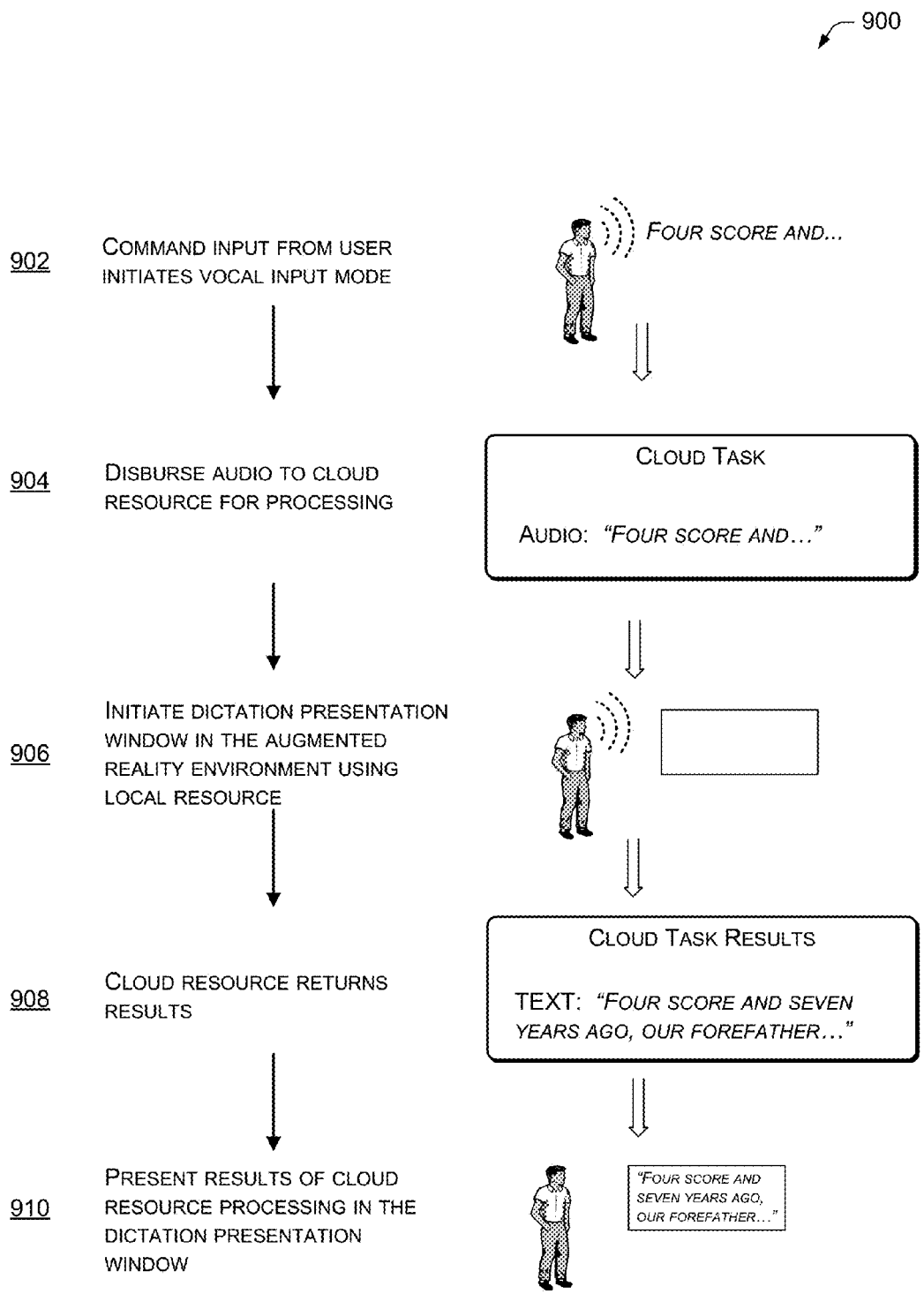
FIG. 9 depicts a scenario where tasks are distributed amongst resources by the augmented reality application.

FIG. 9 depicts a scenario 900 where tasks are distributed amongst resources. In this scenario, at 902 a user issues a command input such as a particular hand gesture to initiate a vocal input mode in the augmented reality environment 102. This vocal input mode of the augmented reality application 108 begins to listen for speech in the audio input received from the microphone 218.

Suppose the user has an unfamiliar accent and the application 108 has determined that this will result in recognized speech which contains an unacceptably high number of errors. The task distribution module 808 after assessing the task parameters 806 and the available resources, has determined that the task should be processed with cloud resources 110. As a result, at 904 the task of processing of the audio of the vocal input is disbursed by the task disbursement interface module 818 to the cloud resource 110 via the cloud resources interface 824. In some implementations as described above, processing may be performed using several resources, such as local processing resources to get a quick and rough set of recognized speech and later updating the results with cloud processed results.

Meanwhile, at 906 another task which is executed locally on the device such as within the computing device 326 initiates a dictation related presentation window within the augmented reality environment 102. As shown here, a rectangular "note space" is projected on a surface for the user to view.

At 908, the cloud resource 110 has completed the task of recognizing the speech disbursed to it and returned the results to the application 108. These returned results are passed via the task disbursement interface module 818 to the application module 802 which at 910 presents the cloud resource results in the presentation window.

Figure 10:
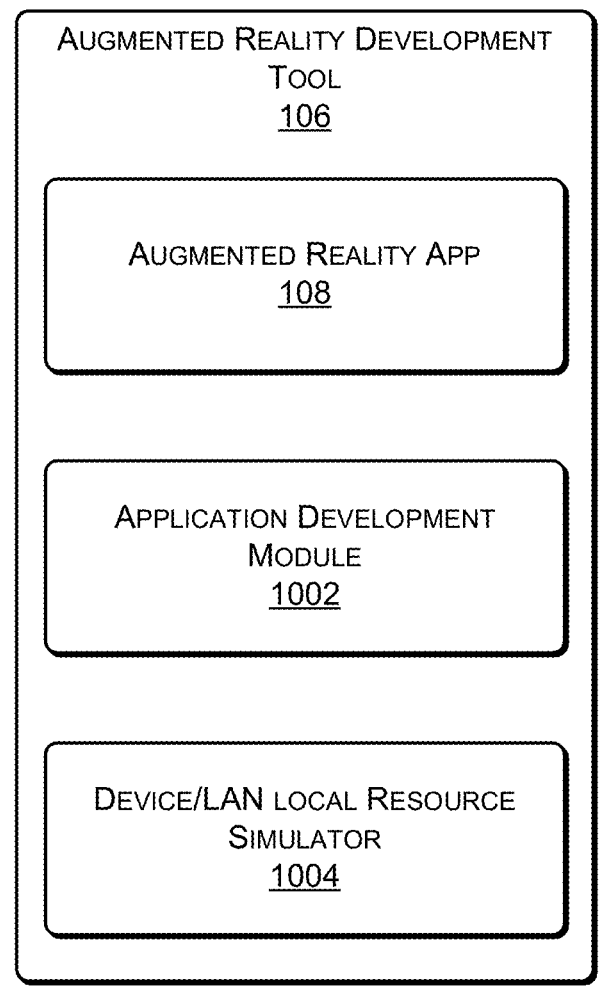
FIG. 10 illustrates modules of an augmented reality development tool.

FIG. 10 illustrates modules of the augmented reality development tool 106 that may be used, for example, but the developer 104 in the ecosystem 100 of FIG. 1. The augmented reality tool 106 may incorporate the augmented reality app 108 and associated modules as described above with regards to FIG. 8.

Also present is an application development module 1002 that provides application building functions to the developer 104. These functions may include a code entry interface, debugging tools, code library access, and so forth.

A device/LAN local resource simulator 1004 may also be provided. The simulator 1004 is configured to simulate various devices which may be locally present in a given augmented virtual reality environment 102. For example, the augmented reality environment 102(1) of the developer 104 may not have a thermal camera which is used by the augmented reality application 108 under development. The simulator 1004 may provide simulated input to the application 108 to allow for testing and application validation. In some implementations the resource simulator 1004 may be offered as part of the cloud resources 110.

Figure 11:
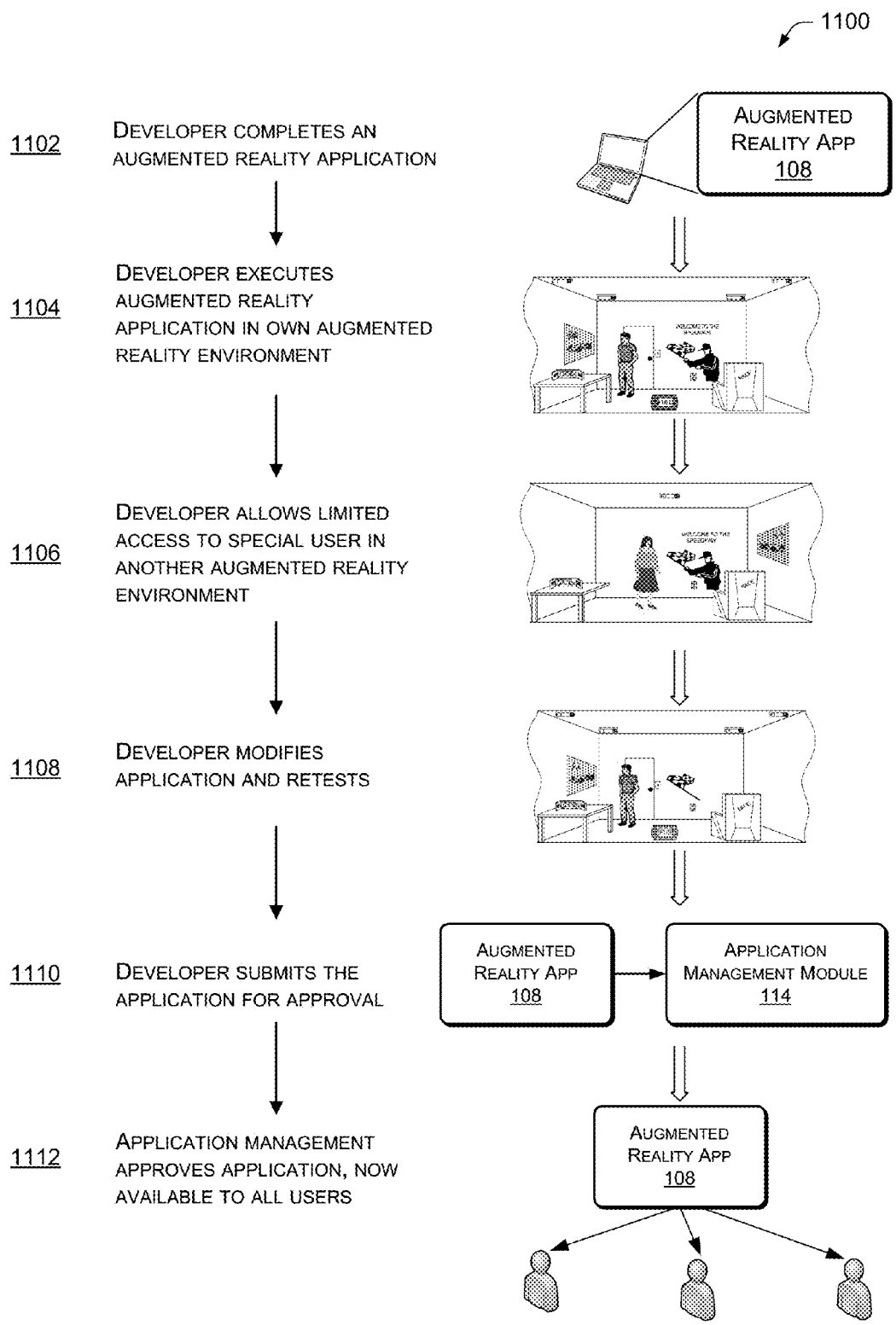
FIG. 11 depicts a scenario of a user developing and testing an augmented reality application.

FIG. 11 depicts a development and testing scenario 1100 of the augmented reality application 108. At 1102, the developer 104 completes an augmented reality application 108. Because the augmented reality development tool 106 is part of the augmented reality environment 102(1), at 1104 the developer may execute the application 108 for testing. As described above, the developer 104 may have written the application 108 to utilize augmented reality resources which are unavailable in the environment 102(1) of the developer 104. In this situation, the resource simulator 1004 may be used to allow the developer 104 to test without having those actual resources in his environment 102(1).

At 1106, the developer 104 may provide limited access to other users, such as the special user 120 by setting permissions via the application management module 114. The special user 120 may receive the application 108 from the cloud resources 110 or directly from the developer 104. The special user 120 proceeds to use the augmented reality application 108 in her augmented reality environment 102(2), and provides some suggestions to the developer 104.

At 1108, the developer 104 modifies the application 108 and retests in his augmented reality environment 102(1). The special user 120 may be provided access to the modified application 108 and retest in her augmented reality environment 102(2) as well.

At 1110, the developer 104 submits the application 108 to the application management module 114 for ingestion. At ingestion, the application management module 114 checks the application 108 for compliance with standards defined for the ecosystem 100. For example, the user interface may be inspected to confirm it is using standardized gestures. Security settings and so forth may also be checked.

The application management module 114 may then apply permissions to the application 108 which control the availability and conditions of access to different users. For example, a low cost initial version of the application 108 may be provided in which the task distribution module 808 is configured to not distribute tasks to non-local device resources. In contrast, the full pay version of the application 108 may be configured to allow resource distribution across all available resources, resulting in improved performance.

Once ingestion is complete and the application 108 conforms to the standards of the ecosystem 100, at 1112 the application management module 114 approves the application. Once approved, the application 108 may be made available for distribution, such as via the application marketplace module 116. The users 122(U) may then select the application 108 from the marketplace, and acquire access rights thereto.

As the augmented reality application 108 is updated, these updates may be made available and installed either on-demand or automatically to the augmented reality environments 102 which have permissions thereto.

Figure 12:
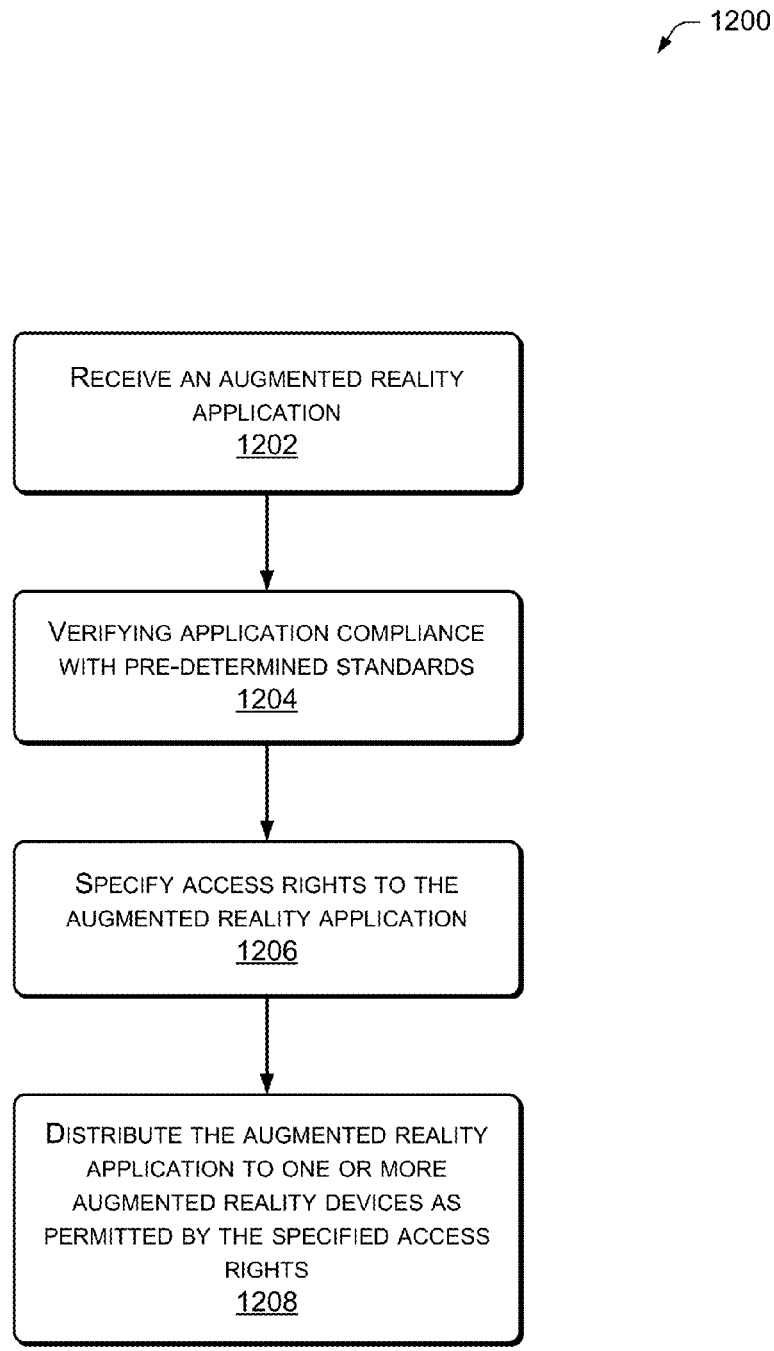
FIG. 12 illustrates a process of preparing and making available an augmented reality application for distribution.

FIG. 12 illustrates a process 1200 of preparing and making available an augmented reality application for distribution. In some implementations, the application management module 114 may execute this process.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other systems as well.

At 1202, the augmented reality application 108 is received. This application 108 is configured to support or modify an augmented reality environment 102. For example, the application may be configured to accept dictation and present the dictated text in a virtual window on a wall.

At 1204, application compliance with pre-determined standards 1204 is verified. For example, the user interface of the application 108 may be scrutinized to insure that common control inputs or gestures have not been assigned contradictory functions.

Once the application complies with the pre-determined standards, at 1206, access rights to the augmented reality application 108 are specified. The developer 104, a third party entity, or other interested parties may set these access rights. In some implementations, limited access rights may be specified for non-approved applications 108. For example, during testing of the augmented reality application 108, the developer 104 may involve the special user 120 to help test the application. The limited access rights may restrict access rights to particular augmented reality environments 102, users, groups of users, and so forth.

At 1208, the augmented reality application 108 is distributed to one or more augmented reality devices within one or more augmented reality environments 102(1)-(E) as permitted by the specified access rights. For example, the application 108 may be made visible to the public via the application marketplace module 116.

Figure 13:
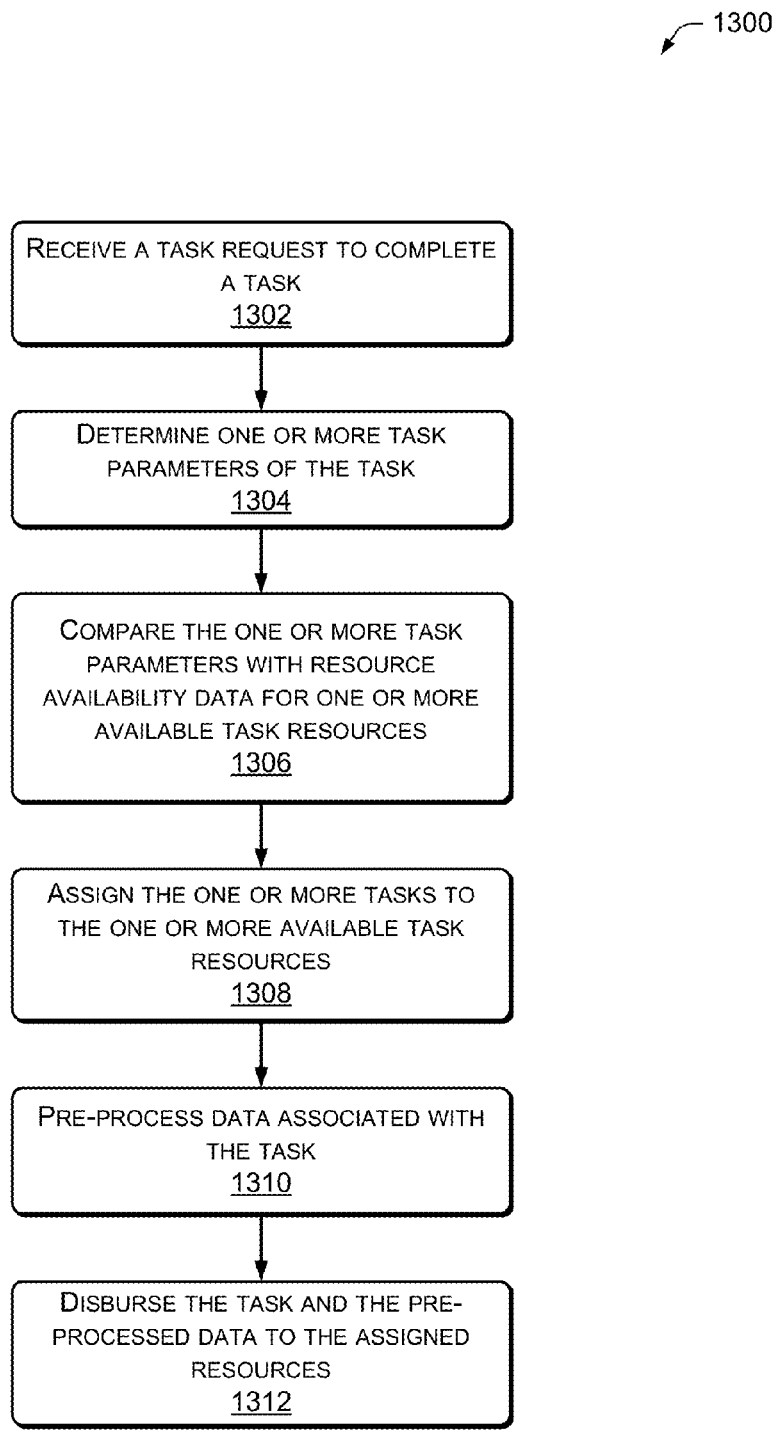
FIG. 13 illustrates a process of distributing tasks between devices in an augmented reality environment.

FIG. 13 illustrates a process 1300 of distributing tasks. As described above with regards to FIG. 5, different augmented reality devices may offer different resources useful in handling tasks related to the generation or maintenance of the augmented reality environment 102. As described above with regards to FIG. 7, tasks may be distributed among the local device resources 608, the LAN resources 610, and the cloud resources 110.

At 1302, a task request to complete a task in the augmented reality environment 108 is received. For example, the task analysis module 804 may receive a request for speech recognition of audio.

At 1304, one or more task parameters 806 of the task are determined. For example, the task analysis module 804 may determine that the resource metric 806(2) for the speech recognition task indicates the task will take about twenty seconds to complete.

At 1306, the one or more task parameters 806 are compared with the resource availability data for one or more available task resources. For example, the task distribution module 808 may determine that the response time budget 806(3) for the task is 300 ms but the resource management interface module 810 indicates that the local processor will require 700 ms. However, the processing device 516 on the local network 502 can complete the task in 550 ms, and the cloud resources 110 are available immediately with minimal network latency and can complete the task in 100 ms.

At 1308, the one or more tasks are assigned to the one or more available task resources. For example, the speech recognition task is assigned by the automatic task distribution module 812 to the cloud resources 110.

At 1310, data associated with the task is pre-processed due to the distribution to the cloud resources 110. This pre-processing may comprise data compression, noise removal, signal extraction, and so forth. The pre-processing module 826 may perform the pre-processing.

At 1312, the task and the pre-processed data are disbursed to the assigned resources. For example, the task disbursement interface module 818 may disburse the task 702(4) for speech recognition via the cloud resources interface 824 to the cloud resources 110 for processing.

CONCLUSION

Although the subject matter has been described in language specific to structural features, it is to be understood that the subject matter defined in the appended claims is not necessarily limited to the specific features or operations described. Rather, the specific features or operations are disclosed as illustrative forms of implementing the claims.

What is claimed is:

1. A device coupled to an augmented reality environment, the device comprising:
   a processor;
   a memory coupled to the processor;
   a network adapter;
   an internal task resource capable of processing tasks without receiving data via the network adapter; and
   an augmented reality application stored in the memory and comprising:
      an application module configured to identify one or more tasks based at least in part on input detected by an augmented reality node based on verbal or physical interaction within an augmented reality environment;
      a task analysis module configured to determine one or more security parameters that govern which resources are eligible for processing of the one or more tasks;
      a task distribution module configured to:
         identify, from a collection of resources, task resources capable of processing at least some of the one or more tasks, the task resources including (i) the internal task resource and (ii) external task resources in communication with the device via the network adapter;
         access resource availability data for at least some of the task resources;
         determine available task resources from the task resources based at least in part on comparing the one or more security parameters of the one or more tasks with the resource availability data associated with the task resources;
         assign a task of the one or more tasks to a first task resource of the available task resources, the first task resource being the internal task resource and the first task resource processing the task using a first algorithm and first reference data to generate a first textual result; and
         assign the task to a second task resource of the available task resources, the second task resource being accessible via the network adapter of the device, the second task resource processing the task using a second algorithm and second reference data while using same input data as the first task resource to generate a second textual result; and
      a task disbursement interface module configured to disburse the task to the first task resource and the second task resource and receive the first textual result and the second textual result from the first task resource and the second task resource, at least one of the first textual result or the second textual result being used to modify the augmented reality environment, wherein the task of the one or more tasks is processed in parallel by the first task resource and the second task resource.

2. The device of claim 1, further comprising a structured light projector and a camera coupled to the processor and configured to recover the structured light and wherein the augmented reality application is configured to accept data from the recovered structured light to identify at least gestures provided by a user from the physical interaction within the augmented reality environment, the gestures used by the application module to identify the one or more tasks.

3. The device of claim 1, wherein the one or more security parameters restrict at least one task from being sent by the device via the network adapter.

4. The device of claim 1, wherein the task disbursement interface module is further configured to:
   implement the first textual result to modify the augmented reality environment;
   determine that the second textual result is different than the first textual result, the second textual result received after the first textual result; and
   implement, without user input, the second textual result to replace a portion of the first textual result.

5. The device of claim 1, wherein the task distribution module assigns the task of the one or more tasks to the two or more resources to minimize overall response time.

6. The device of claim 1, wherein the task distribution module assigns the task of the one or more tasks to the two or more resources according to at least one of a pre-determined preferential resource hierarchy or a pre-determined mapping.

7. The device of claim 1, wherein the first task resource includes a first time budget for processing the task and the second task resource includes a second time budget for processing the task, wherein a difference between the first time budget and the second time budget is based at least in part on latency caused by use of the network adapter.

8. The device of claim 1, wherein the task disbursement interface module is configured to disburse another task of the one or more tasks to each of (i) the local devices accessible via the internal communication bus, the local area network devices accessible via the local area network, and the cloud resources accessible via the wide area network.

9. The device of claim 1, further comprising an augmented reality development application stored in the memory and comprising a development application module configured to build or modify the augmented reality application.

10. The device of claim 9, further comprising a resource simulator configured to simulate resources available on local devices, local area network devices, or both.

11. The device of claim 1, wherein the augmented reality module further comprises a pre-processing module configured to pre-process data associated with the task prior to disbursement of the data to the assigned resource.

12. The device of claim 1, wherein the second textual result is received after the first textual result, and wherein the task interface module is further configured to:
   implement the first textual result to modify the augmented reality environment; and
   implement at least a portion of the second textual result to further modify the augmented reality environment.

13. The device of claim 1, wherein the application module is further operable to sense one or more physical objects in the augmented reality environment based at least in part on an appearance of the one or more physical objects, and wherein the input detected by the augmented reality node is based at least in part on the physical interaction with the one or more physical objects within the augmented reality environment.

14. The device of claim 1, wherein the task includes processing speech, and wherein the first textual result includes first text generated by the first resource resulting from processing the task, and wherein the second textual result includes second, different text generated by the second resource resulting from processing the task, the second textual result being an authoritative result that is prioritized over the first textual result.

15. One or more non-transitory computer-readable media storing computer-executable instructions that, when executed, cause one or more processors to perform acts comprising:
   receiving, at an augmented reality device, a task request to complete a task associated with modifying an augmented reality environment;
   determining one or more task parameters of the task;
   accessing resource availability data for task resources;
   comparing the one or more task parameters with the resource availability data of the task resources to determine available task resources located throughout or coupled to the augmented reality environment;
   assigning the task to an internal task resource of the available task resources located internal to the augmented reality device, the internal task resource using a first algorithm to generate a first textual result using input data;
   assigning the task to an external task resource of the available task resources in communication with the augmented reality environment via a network adapter, the external task resource using a second algorithm to generate a second textual result using the input data, the task to be processed separately by the first task resource and by the second task resource;
   distributing the task to the first task resource;
   distributing the task to the second task resource;
   receiving the first textual result from the internal task resource; and
   receiving the second textual result from the external task resource, wherein the first textual result is different than the second textual result.

16. The one or more non-transitory computer-readable storage media of claim 15, wherein the computer-executable instructions cause one or more processors to perform acts comprising:
   presenting a first output based at least in part on the first textual result; and
   presenting a second output to replace the first output, the second output based at least in part on the second textual result.

17. The one or more non-transitory computer-readable storage media of claim 15, wherein the augmented reality environment comprises an interactive scene of physical objects and virtual objects.

18. The one or more non-transitory computer-readable storage media of claim 15, wherein at least some of the task resources comprise shared resources accessible to a plurality of augmented reality environments and accessible via the network adapter.

19. The one or more non-transitory computer-readable storage media of claim 15, wherein the assigning comprises a comparison of the one or more tasks with a pre-determined preferential resource hierarchy.

20. The one or more non-transitory computer-readable storage media of claim 15, wherein the assigning comprises a pre-determined mapping between specified tasks and specified resources.

21. A method comprising:
   receiving a task request to complete a task associated with modifying an augmented reality environment;
   determining one or more task parameters of the task;
   accessing resource availability data for task resources;
   comparing, by one or more computing devices, the one or more task parameters with the resource availability data of the task resources to determine available task resources;
   distributing the task to an internal task resource of the available task resources, the internal task resource processing the task using a first algorithm and first reference data to generate a first textual result, the task distributed to the internal task resource without use of a network adapter;
   distributing the task to an external task resource of the available task resources, the external task resource processing the task using a second algorithm and second reference data to generate a second textual result, the task distributed to the external task resource using the network adapter, wherein the internal task resource and the external task resource use same input data for the task and process the task independently; and
   receiving the first textual result from the internal task resource and the second textual result from the external task resource, the second textual result being different than the first textual result.

22. The method as recited in claim 21, further comprising:
   implementing the first textual result from the internal task resource; and
   implementing the second textual result from the external task resource to replace the first textual result, wherein the first textual result is received before the second textual result.

23. The method as recited in claim 21, wherein the task includes processing speech to determine textual content, and further comprising:
   receiving first text as the first textual result from the internal task resource; and
   receiving second text as the second textual result from the external task resource, wherein the second text is different than the first text.

24. The method as recited in claim 21, wherein the one or more task parameters includes a security parameter, and further comprising distributing another task to the internal task resource based at least in part on the security parameter.

* * * * *